United States Patent
Oguchi et al.

(10) Patent No.: US 6,249,167 B1
(45) Date of Patent: Jun. 19, 2001

(54) SEMICONDUCTOR INTEGRATED CIRCUIT, SEMICONDUCTOR DEVICE, AND ELECTRONIC EQUIPMENT COMPRISING THE SAME

(75) Inventors: Yasuhiro Oguchi, Chino; Yoshiyuki Miyayama, Suwa, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/254,136

(22) PCT Filed: Jun. 30, 1998

(86) PCT No.: PCT/JP98/02920

§ 371 Date: Jun. 3, 1999

§ 102(e) Date: Jun. 3, 1999

(87) PCT Pub. No.: WO99/01811

PCT Pub. Date: Jan. 14, 1999

(30) Foreign Application Priority Data

Jul. 3, 1997 (JP) .................................................. 9-178623

(51) Int. Cl.[7] ..................................................... G06F 1/04
(52) U.S. Cl. .......................... 327/291; 327/298; 327/544
(58) Field of Search .................................. 327/291, 298, 327/544, 545, 546; 365/226, 227

(56) References Cited

U.S. PATENT DOCUMENTS 4,316,247 * 2/1982 Iwamoto ............................... 365/227
5,390,224 * 2/1995 Komatsuda ............................ 377/56
5,692,201   11/1997 Yato ..................................... 713/322
5,742,194 *  4/1998 Saeki ................................... 327/298

FOREIGN PATENT DOCUMENTS 2-293915   12/1990  (JP) .
4-167113    6/1992  (JP) .
8-6681      1/1996  (JP) .
8-87364     4/1996  (JP) .

* cited by examiner

*Primary Examiner*—Kenneth B. Wells
*Assistant Examiner*—Paul Dinh
(74) *Attorney, Agent, or Firm*—Oliff & Berridge, PLC

(57) ABSTRACT

The semiconductor integrated circuit of this invention comprises at least one first semiconductor circuit (10) that is driven on the basis of on at least one first clock signal (20). In addition, there is at least one second semiconductor circuit (50) assisting the first semiconductor circuit (10), which operates on the basis of at least one second clock signal (92) independent of the first clock signal (20) and a request from the first semiconductor circuit (10). The second semiconductor circuit (50) comprises a halt means (51) that causes the second clock signal (92) to halt if necessary. This makes it possible to halt the second clock signal (92), thus halting the operation of the second semiconductor circuit (50).

22 Claims, 14 Drawing Sheets

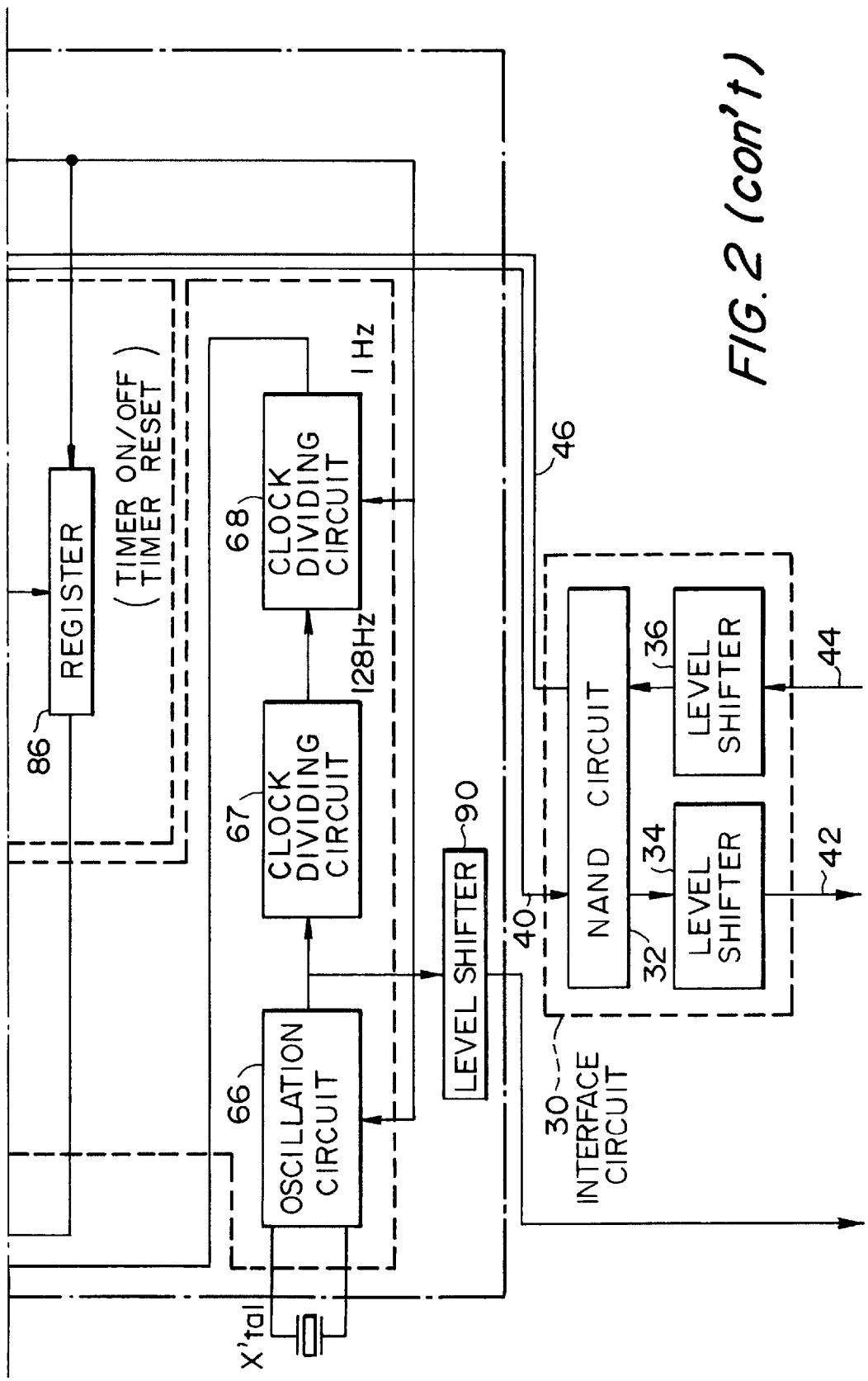
FIG. 2 (con't)

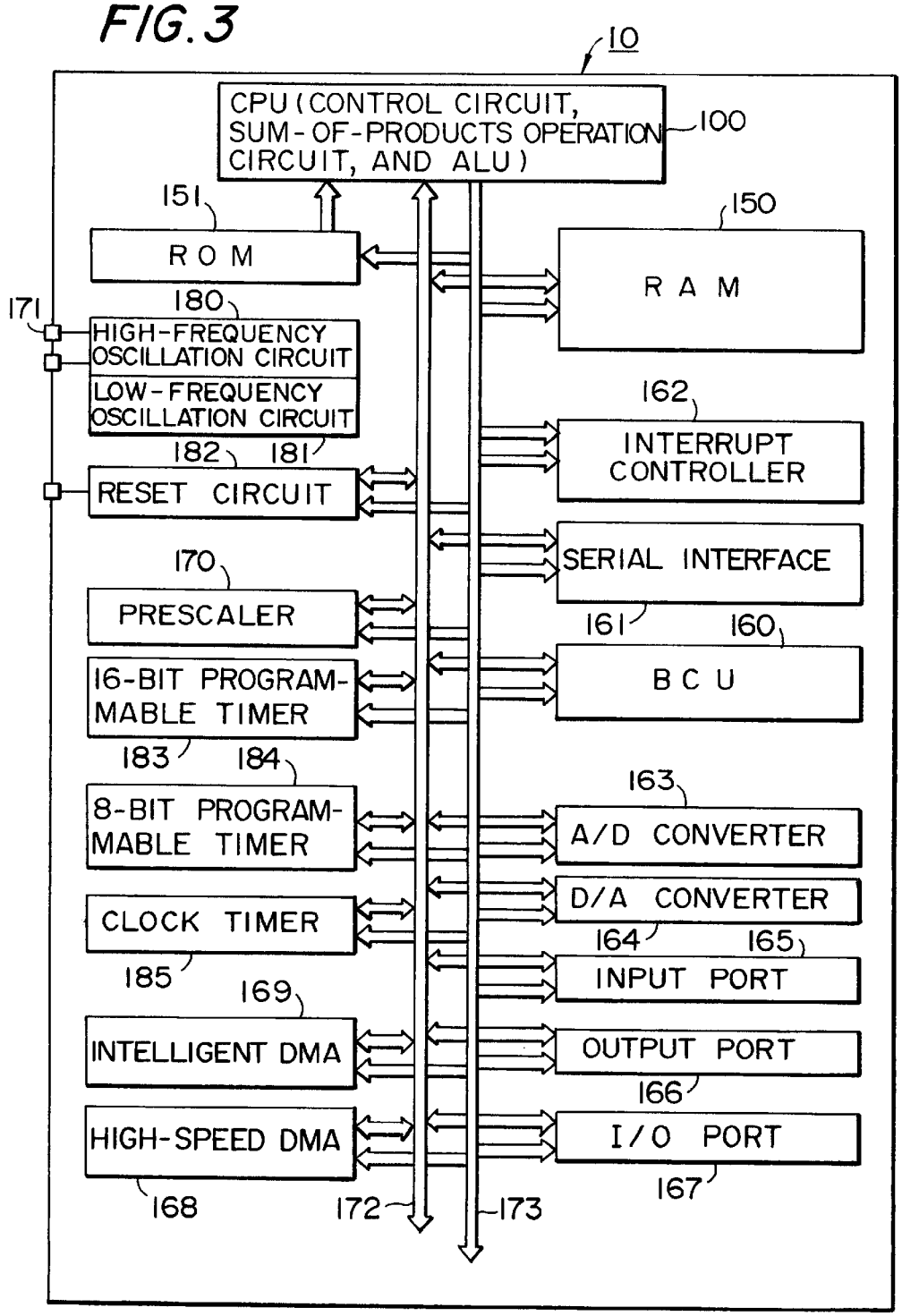

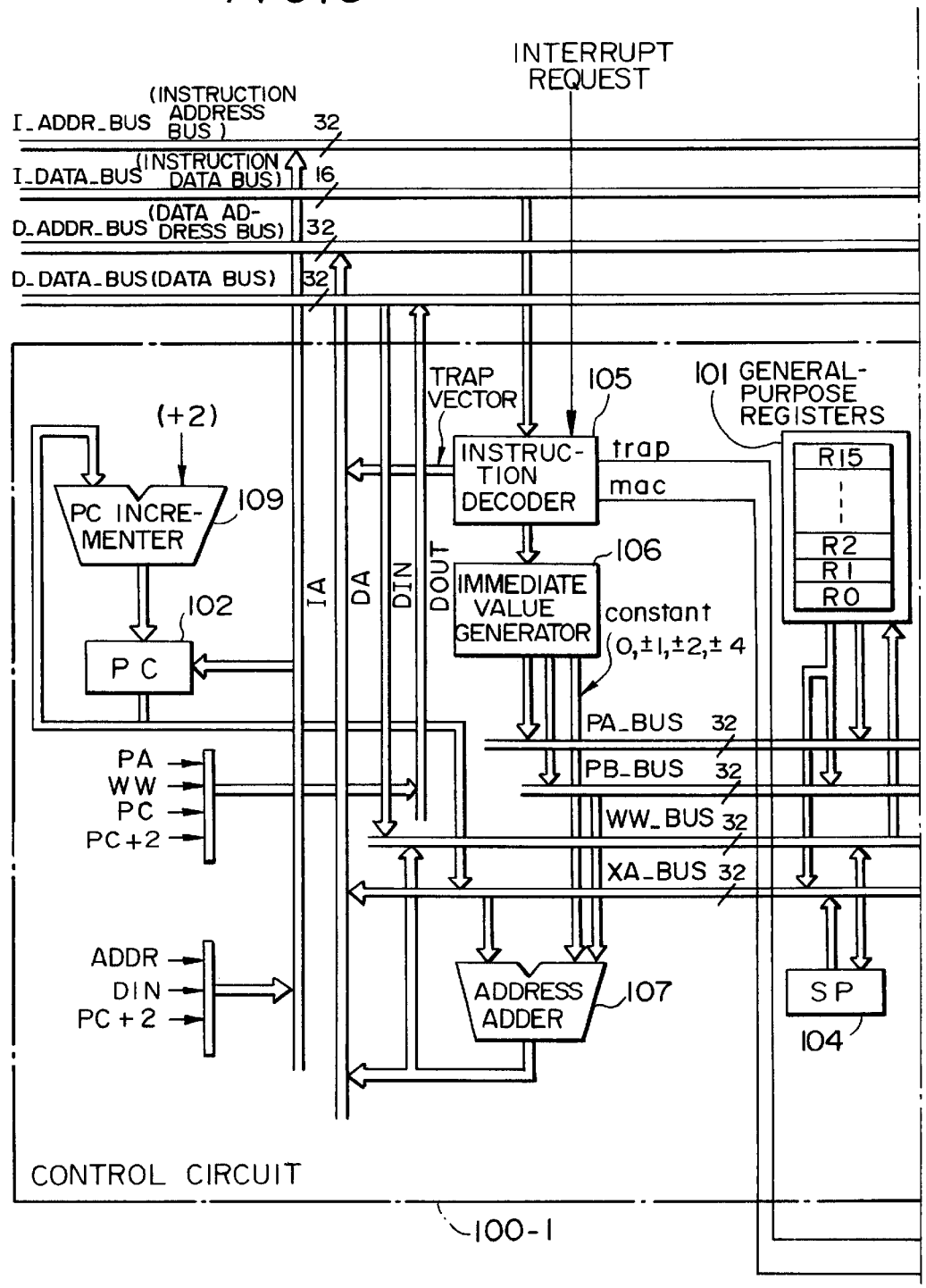

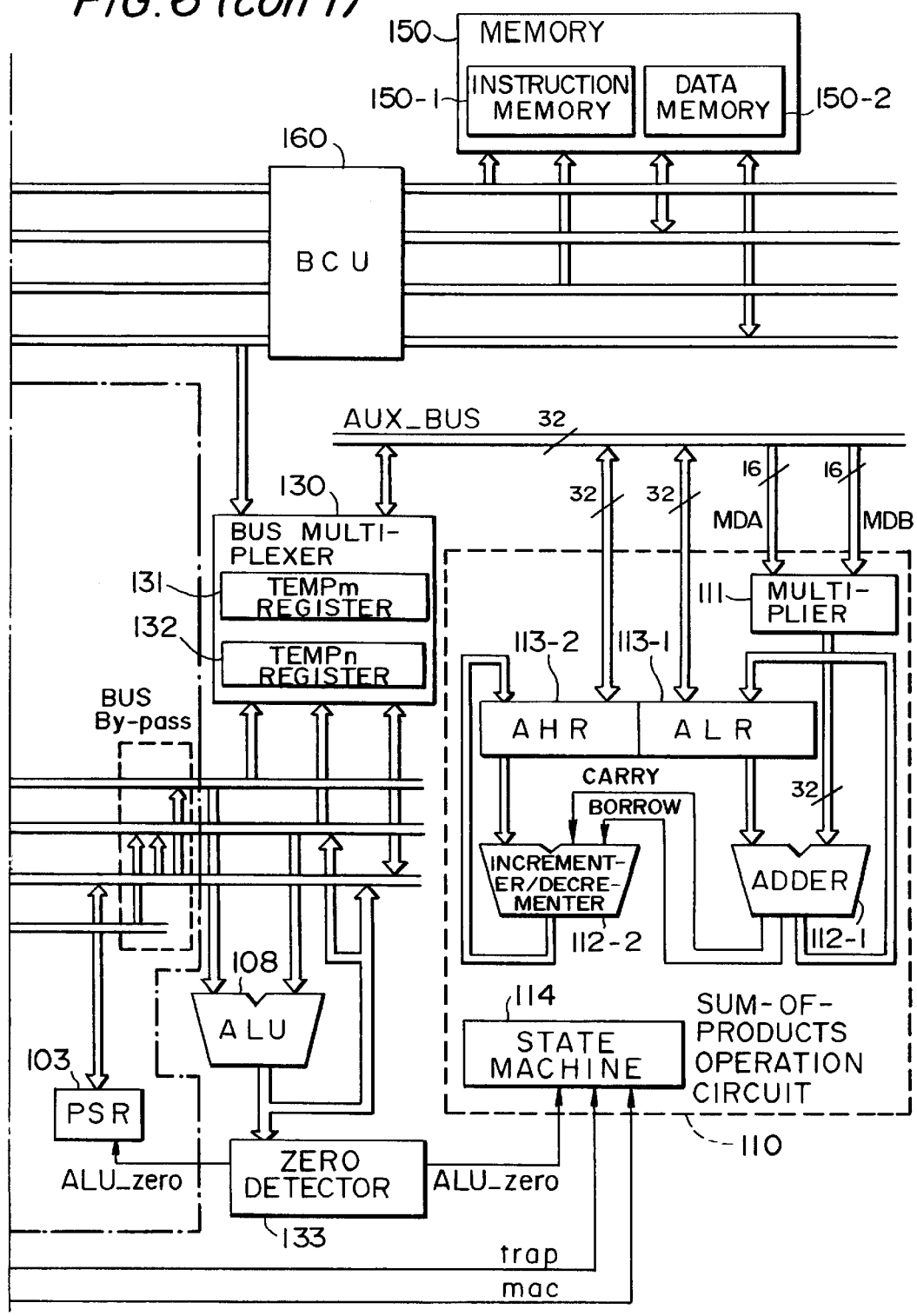
FIG.6 (con't)

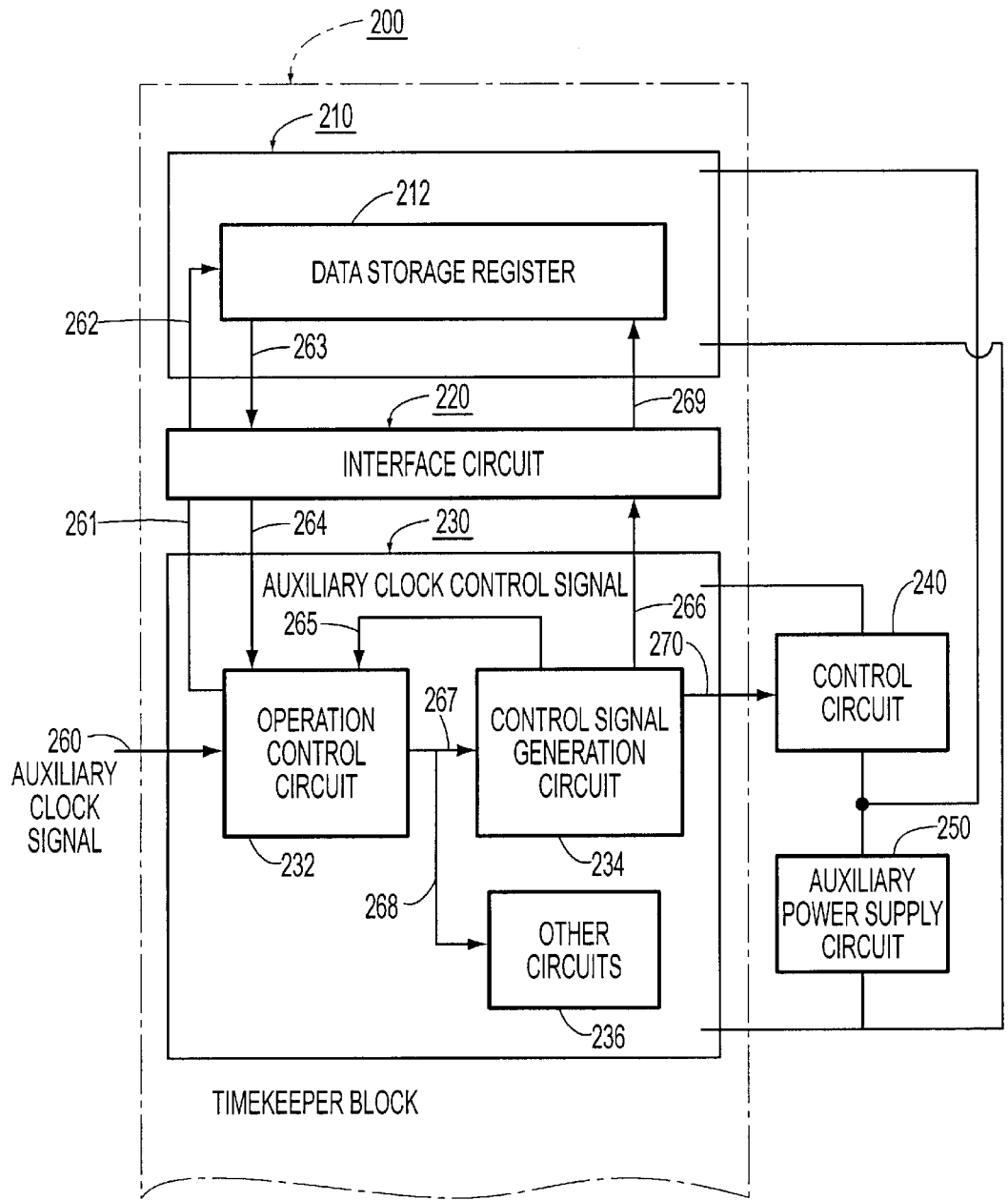

SEMICONDUCTOR INTEGRATED CIRCUIT, SEMICONDUCTOR DEVICE, AND ELECTRONIC EQUIPMENT COMPRISING THE SAME

TECHNICAL FIELD

This invention relates to a semiconductor integrated circuit, a semiconductor device, and electronic equipment comprising the same, and, in particular, to such devices wherein a timekeeper clock signal can be halted by a time measurement circuit.

BACKGROUND ART

A time measurement circuit of this type is shown in FIG. 12 by way of example. An example of a general-purpose time measurement circuit is shown in FIG. 9. FIG. 12 is a block diagram of a prior-art semiconductor integrated circuit comprising a time measurement circuit that operates on an auxiliary clock signal.

The semiconductor integrated circuit comprises a main circuit 710 drive on the basis of a main system clock signal 760, an auxiliary circuit 730 driven on the basis of an auxiliary clock signal 770 with the objective of providing timing or the like, and an interface circuit 720 that electrically connects together the auxiliary circuit 730 and the main circuit 710 by inter-block signals 781, 782, and 783. In this case, the main system clock signal is a clock for driving the main circuit and the auxiliary clock signal is an assistant clock for providing timing for measuring the passage of time, by way of example, In addition, the semiconductor integrated circuit comprises a main power supply circuit 750, which is connected electrically to the main circuit 710 and supplies a potential to the main circuit 710, and an auxiliary power supply circuit 740, which is connected electrically to the auxiliary circuit 730 and supplies a potential to the auxiliary circuit 730.

Within the main circuit 710 are a first control circuit 712, which receives the main system clock signal 760 and operates in accordance with this main system clock signal 760, and a second control circuit 714, which is connected electrically to the first control circuit 712 by an inter-block signal 762 and is connected electrically to the main power supply circuit 750 by the inter-block signal 764.

Within the auxiliary circuit 730 are a first control circuit 732, which receives the auxiliary clock signal 770 and operates in accordance with this auxiliary clock signal 770, a second control circuit 734 connected electrically to the first control circuit 732 by an inter-block signal 772, and other circuits 736.

In the semiconductor integrated circuit of the above described configuration, the main system clock signal 760 of the main circuit 710 can be halted by the inter-block signal 764, independent of the auxiliary circuit 730.

However, this auxiliary circuit 730 is unable to continue operating independently of the main circuit 710, nor can the auxiliary clock signal 770 be halted. This leads to a problem in that, although the power consumption of the main circuit can be constrained if necessary, it is not possible to halt the auxiliary circuit and the auxiliary power supply and thus the auxiliary circuit always consumes power, which makes it impossible to reduce the power consumption of the entire semiconductor integrated circuit.

Since the auxiliary clock signal 770 cannot be halted, circuits driven by this clock signal 770 continue to operate regardless of whether or not they are necessary, which increases the power consumption. In particular, if the auxiliary circuit 730 is configured as a time measurement circuit, by way of example, a problem occurs in that a fixed period of time is measured thereby and the auxiliary circuit 730 cannot be halted, even when there is no need to measure time beyond that fixed period, so it is not possible to constrain the power consumption during the time after that fixed period, when there is no longer any need to continue the measurement.

In addition, semiconductor devices with lower voltage specifications are becoming more popular from the viewpoint of reducing the power consumption, and the operation of a time measurement circuit has a large effect on power consumption, even in a semiconductor device which is used together with a time measurement circuit mounted thereon, and thus there are demands for further reductions in power consumption.

The present invention was devised in the light of the above described technical concerns and has the objective of providing a semiconductor integrated circuit, a semiconductor device, and electronic equipment that comprises the same, which are capable of halting the auxiliary circuit when it is not required, to constrain the amount of power consumed by that auxiliary circuit, thus enabling a reduction in the power consumption of the entire semiconductor integrated circuit.

DISCLOSURE OF THE INVENTION

According to a first aspect of the present invention, there is provided a semiconductor integrated circuit comprising: at least one first semiconductor circuit operating on the basis of at least one first clock signal; at least one second semiconductor circuit for assisting the first semiconductor circuit, operating on the basis of a request from the first semiconductor circuit and at least one second clock signal independent of the first clock signal. This second semiconductor circuit has halt means that causes the second clock signal to halt.

With a semiconductor integrated circuit having a first semiconductor circuit and a second semiconductor circuit, this aspect of the invention makes it possible for the first semiconductor circuit to halt the operation of the first semiconductor circuit by halting the first clock signal. On the other hand, the operation of the second semiconductor circuit can be halted by halting the second clock signal. In contrast to the prior-art configuration in which it is not possible to halt the second semiconductor circuit, this invention makes it possible to allow the second semiconductor circuit to operate only within a period in which it is used, by halting the second clock signal for a desired period of time, thus reducing the power consumed by the second semiconductor circuit by the amount corresponding to the time in which it is not used.

The halt means may comprise control signal generation means for generating at least one clock control signal for controlling the halting and non-halting of the second clock signal; and operation control means for controlling the halting of operation of the second clock signal, based on the clock control signal.

The halting and non-halting of the second clock signal can be controlled by the operation control means that bases its operation control on the clock control signal. This ensures that the second clock signal can be halted for only the desired period.

The halt means may further comprise: setting means for causing a halt period to be set for the second clock signal, based on a request from the first semiconductor circuit; and counter means for counting the operating period of the second clock signal and outputting the thus-counted counter value to the operation control means. When the counter value has reached the halt period, the operation control means may cause the output of the clock control signal of the control signal generation means, to halt the second clock signal.

A halt start time and halt end time for the halting of the second semiconductor circuit can be set as desired by setting means that is used for setting a halt period for the second clock signal. This makes it possible to control the second semiconductor circuit.

Each of the operation control means, the counter means, and the control signal generation means may be provided with a transistor of a first conductivity type and a transistor of a second conductivity type having a conductivity opposite to the first conductivity type. The transistor of the first conductivity type of the counter means may be electrically disconnected from the transistors of the first conductivity type of the operation control means and the control signal generation means, and the transistor of the second conductivity type of the counter means may be electrically connected to the transistors of the second conductivity type of the operation control means and the control signal generation means.

Potentials can be supplied independently by forming transistors of a first conductivity type and transistors of a second conductivity type, and electrically separating the counter means from the operation control means and the control signal generation means.

The setting means may comprise storage means for storing the halt period for the second clock signal, and data write means for writing the halt period to at least the storage means, based on a request from the first semiconductor circuit.

This makes it possible to easily change the time setting that allows the second clock signal to operate up until a predetermined time then stop, by a configuration in which it is possible to pre-store the halt period for halting the second clock signal.

The second semiconductor circuit may include a power supply circuit for operating the second semiconductor circuit itself and a control circuit for controlling this power supply circuit; and the control signal generation means may output a control signal for controlling the control circuit, to the control circuit.

The provision of a power supply circuit for supplying a potential to the second semiconductor circuit and a control means that controls the power supply circuit makes it possible to use the control signal generation means to halt the power supply circuit itself. In this type of second semiconductor circuit, only the leakage currents of the transistors are flowing. Even if the power supply circuit is not halted, power consumption can be reduced by putting the second clock signal, which drives the second semiconductor circuit, into a halted state (sleep state). However, since the power supply circuit itself is not halted, a small amount of power is consumed by leakage currents. In that case, this invention makes it possible to reduce even this amount of power consumption by a configuration in which the power supply circuit can be halted in addition to the halting of the second clock signal, enabling an even further reduction in power consumption.

Each of the counter means, the operation control means, and the control signal generation means in the second semiconductor circuit may operate by using the power supply circuit as a power source.

The control signal generation means, counter means, and operation control means each operate using the power supply circuit as a power source, so that the circuits configuring these means can all be halted by halting the power supply circuit.

The second semiconductor circuit may be a time measurement circuit.

If the second semiconductor circuit is a time measurement circuit, the second semiconductor circuit can be allowed to operate only for a predetermined measurement time, then the second semiconductor circuit can be halted during the time from the measurement time onward. This makes it possible to fabricate a circuit in which power consumption can be constrained, even if a time measurement circuit is provided within the semiconductor circuit.

The semiconductor integrated circuit may further comprise input-output means for transferring data between the second semiconductor circuit and the first semiconductor circuit.

This makes it possible to perform voltage conversions with the input-output means, by way of example, to input and output data between the first semiconductor circuit and the second semiconductor circuit when the first semiconductor circuit and the second semiconductor circuit are driven by mutually different voltages.

The second semiconductor circuit may further comprise input-output means for inputting and outputting data between data maintenance means and the operation control means and control signal generation means.

This makes it possible to form the data maintenance means and the operations control means/control signal generation means as circuits operated by mutually different voltages. In that case, it is possible to perform voltage conversions with this input-output means, by way of example, and input and output data between the data maintenance means and the operation control means and control signal generation means.

The first semiconductor circuit may comprise a main power supply circuit for supplying a potential to the first semiconductor circuit; and a main power supply control circuit that controls the main power supply circuit by outputting a power supply halt signal based on the first clock signal, for halting the main power supply circuit.

This makes it possible to reduce the power consumed in the operation of the first semiconductor circuit, by halting the main power supply circuit for the first semiconductor circuit. It is therefore possible to reduce the power consumption of the entire semiconductor device by reducing the power consumed by the first semiconductor circuit, in addition to reducing the power consumed by the second semiconductor circuit.

According to a second aspect of the present invention, there is provided a semiconductor device comprising: the above semiconductor integrated circuit; a first power supply circuit for shaping a voltage to be supplied to the first semiconductor circuit of the semiconductor integrated circuit; and a second power supply circuit for shaping a voltage to be supplied to the second semiconductor circuit of the semiconductor integrated circuit. The semiconductor integrated circuit, the first power supply circuit, and the second power supply circuit are preferably formed on the same substrate.

This makes it possible to implement the halting of the first semiconductor circuit by halting the first power supply circuit, and the halting of the second semiconductor circuit by halting the second power supply circuit, because the first power supply circuit, the semiconductor integrated circuit, and the second power supply circuit are formed on the same substrate.

According to a third aspect of the present invention, there is provided a semiconductor device comprising: the above described semiconductor integrated circuit; a first oscillation circuit for forming the first clock signal; a second oscillation circuit for forming the second clock signal; and a dedicated power supply for a substrate on which the semiconductor integrated circuit and the first and second oscillation circuits are formed, for supplying power to the circuits on the substrate.

This aspect of the invention is provided with first and second oscillation circuits for generating first and second clock signals, and the first and second semiconductor circuits can be halted by halting the oscillation of the first and second oscillation circuits. Since a dedicated power supply is provided for the substrate, the first semiconductor circuit can be halted by halting this dedicated substrate power supply.

There is provided electronic equipment in accordance with a fourth aspect of this invention comprises one of the above semiconductor devices. With this electronic equipment, it is possible to halt the second semiconductor circuit whenever the second semiconductor circuit is not operating, by halting the second semiconductor circuit independently of the first semiconductor circuit, thus reducing the power consumed within the second semiconductor circuit. This makes it possible to reduce the waste of power in the electronic equipment as a whole, enabling electronic equipment in which power consumption is reduced optimally.

BRIEF DESCRIPTION OF DRAWINGS

FIG. 3 is a block diagram showing details of the main circuit of the semiconductor integrated circuit of FIG. 1.

FIG. 6 is a detailed functional block diagram of the CPU of the main circuit in the semiconductor integrated circuit of FIG. 1.

FIG. 7 is a block diagram of an example of another embodiment of the semiconductor integrated circuit in accordance with this invention.

BEST MODE FOR CARRYING OUT THE INVENTION

Embodiments of this invention when applied to the time measurement circuit of a semiconductor integrated circuit will be described below, with reference to the accompanying drawings.

Embodiment 1

Overall Configuration

Figure 1:
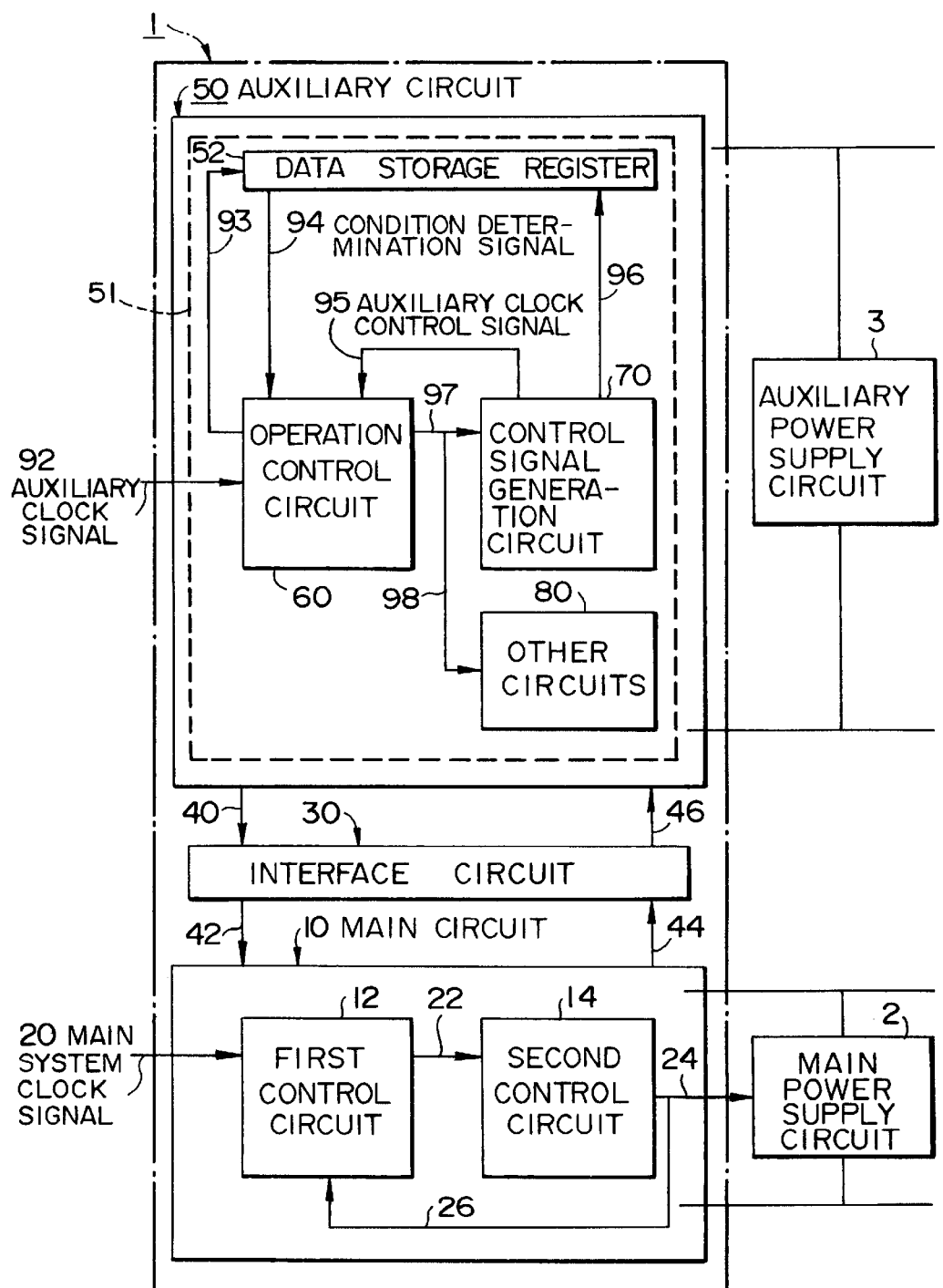
FIG. 1 is a block diagram of a typical embodiment of a semiconductor integrated circuit in accordance with this invention.

A block diagram of the overall configuration of a semiconductor integrated circuit 1 is shown in FIG. 1. This semiconductor integrated circuit 1 could be one used in electronic equipment such as a printer, by way of example. More specifically, this semiconductor integrated circuit includes a time measurement circuit for measuring a power supply halt period immediately before the power was turned on, wherein a decision is to be made whether or not to perform an operation such as cleaning when power is turned on (at restart), based on that power supply halt period. Note that the overall concept of such electronic equipment will be described in detail later, with reference to Embodiment 4.

The semiconductor integrated circuit 1 of this example comprises a main circuit 10 (first semiconductor circuit) that operates on the basis of a main system clock signal 20 (first clock signal), as shown in FIG. 1. It also comprises an auxiliary circuit 50 (second semiconductor circuit) which assists the main circuit 10 and operates on the basis of an auxiliary clock signal 92 (second clock signal) that is independent of the main system clock signal. This auxiliary circuit 50 is equivalent to the previously mentioned time measurement circuit. An interface circuit 30 is provided between the main circuit 10 and the auxiliary circuit 50 as an input-output means for transferring data between the main circuit 10 and the auxiliary circuit 50.

In addition, the main circuit 10 is connected to an external main power supply circuit 2 for supplying a potential to the main circuit 10 and powering the main circuit 10 itself. The auxiliary circuit 50 is connected to an auxiliary power supply circuit 3 that lies outside the semiconductor integrated circuit 1, for supplying a potential to the auxiliary circuit 50. Thus the auxiliary power supply circuit 3 and the main power supply circuit 2 are configured to be external to the semiconductor integrated circuit 1. Therefore, the main circuit 10, the interface circuit 30, and the auxiliary circuit 50 of this example are configured as the semiconductor integrated circuit 1, in other words, a single-chip CPU.

The main circuit 10 comprises a first control circuit 12, which outputs a signal 22 based on the main system clock signal 20, and a second control circuit 14 which acts as a main power supply control circuit for controlling the main power supply circuit 2 by outputting a power supply halt signal 24 based on the main system clock signal 20, to cause the main power supply circuit 2 to halt. In addition, a feedback signal 26 is output from the second control circuit 14 for input to the first control circuit 12.

The auxiliary circuit 50 is configured as a time measurement circuit or the like for measuring time, by way of example, and has a halt means 51 for automatically stopping the auxiliary clock signal 92 (time-keeping clock signal) when the auxiliary circuit 50 is not in use. In other words, the auxiliary circuit 50 does not halt by turning off the auxiliary power supply circuit 3, but it halts the internal circuitry by stopping the auxiliary clock signal 92. The auxiliary circuit 50 will consume from the operating current of the circuit while it is operating, but it will go into a static state while operation is halted, so the only slight leakage currents from transistors will flow within the circuit. In this case, no problems occur even if no power-off processing is performed. The timing of the halt can be set by registers 82a to 82c (see FIG. 2) depending on how the printer operates, as will be described later.

The halt means 51 comprises a control signal generation circuit 70 acting as control signal generation means that generates at least one auxiliary clock control signal 95 (clock control signal) for controlling the halting and non-halting of the auxiliary clock signal 92; an operation control circuit 60 acting as operation control means for controlling the halting of the operation of the auxiliary clock signal 92, based on the auxiliary clock control signal 95; other circuits 80 comprising setting means that sets a period during which the auxiliary clock signal 92 is to be halted, based on the auxiliary clock control signal 95; and a data storage register 52 acting as a data maintenance means and a counter means that counts the time turning which the auxiliary clock signal 92 is operating and outputs that count to the operation control circuit 60.

In this case, when the count exceeds the halt period, the operation control circuit 60 causes the auxiliary clock control signal 95 to be output from the control signal generation circuit 70, to halt the auxiliary clock signal 92.

Within the auxiliary circuit 50 are a signal 98 is transferred by an electrical connection between the other circuits 80 and the operation control circuit 60 using the auxiliary clock signal 92 as a base signal; a signal 97 which is transferred by an electrical connection between the control signal generation circuit 70 and the operation control circuit 60; a condition determination signal 94 which is output from the data storage register 52 to the operation control circuit 60; a signal 93 which is output from the operation control circuit 60 to the data storage register 52; the auxiliary clock control signal 95 which is output from the control signal generation circuit 70 to the operation control circuit 60; and a signal 96 which is output from the control signal generation circuit 70 to the data storage register 52.

There are also signals 40 and 42 which are output from the auxiliary circuit 50, through the interface circuit 30, to the main circuit 10, as well as signals 44 and 46 which are output from the main circuit 10, through the interface circuit 30, to the auxiliary circuit 50.

Lines for the signals 44 and 46 can transfer various signals such as signals for turning off the main power supply circuit 2 and for writing timing data to cause the auxiliary circuit 50 to halt into the auxiliary circuit 50 after a predetermined period of time. The signals 40 and 42 are also used for transferring an instruction from the auxiliary circuit 50 to the main circuit 10 to read the counter value in the data storage register 52, to see whether the auxiliary circuit has been halted for a predetermined period, such as one week. A level shifter (voltage conversion means) for integrating the various power supply voltages between different current sources, such as the 5 V system of the main circuit 10 and the 3 V system of the auxiliary circuit 50, is also provided within the interface circuit 30.

Figure 4:
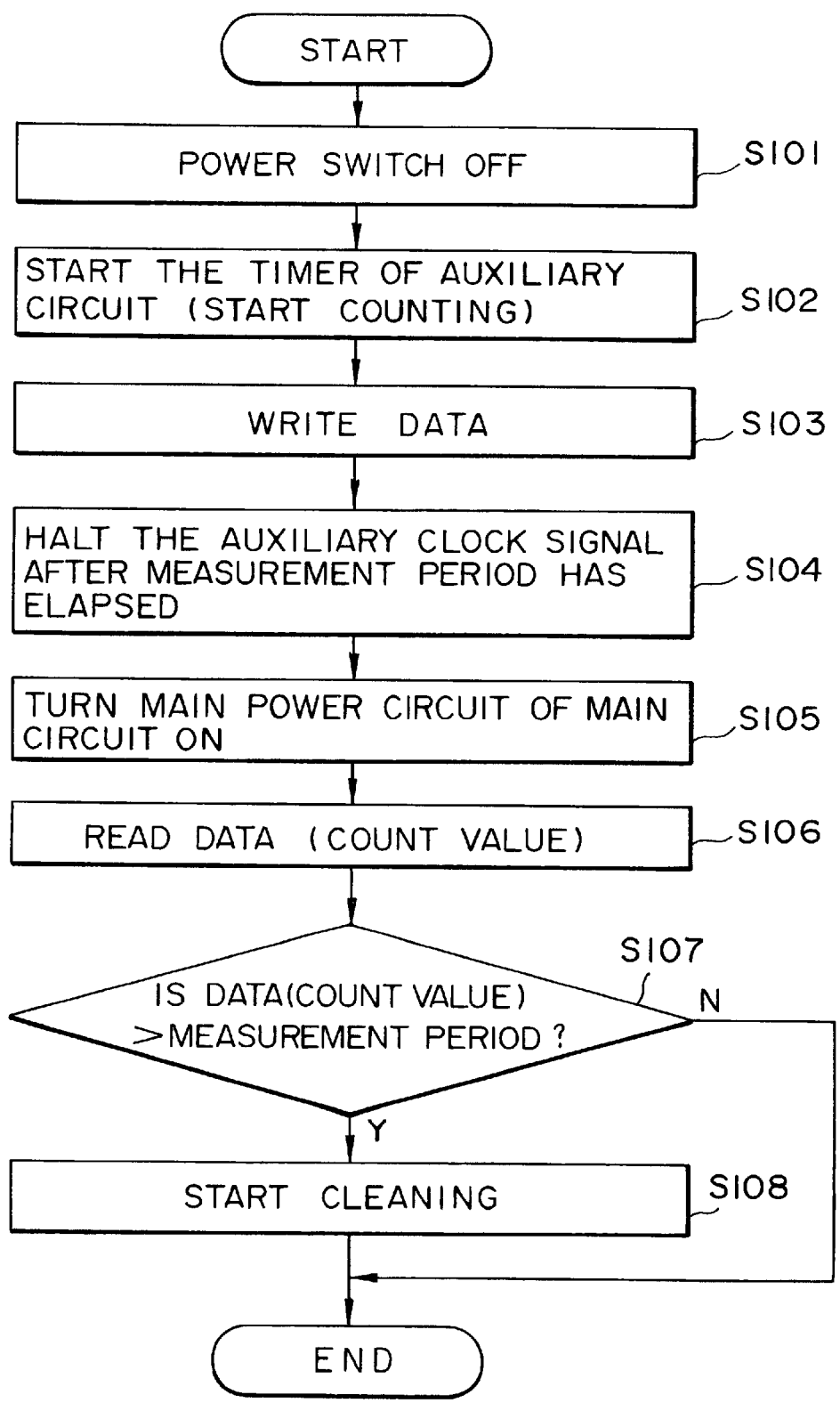
FIG. 4 is a flowchart of the basic operation of the semiconductor integrated circuit of FIG. 1.

The operation of the semiconductor integrated circuit 1 with the above configuration will now be described with reference to FIGS. 1 and 4. FIG. 4 is a flowchart of the basic operation of the semiconductor integrated circuit of FIG. 1.

In the main circuit 10, the main system clock signal 20 always operates and the main power supply circuit 2 is turned on and off by using the first and second control circuits 12 and 14 to control the main power supply circuit 2.

While the main circuit 10 is operating, turning off a main switch (power supply switch), which will be described later, puts the main circuit 10 in a save state and turns the main power supply circuit 2 off (in a step, hereinafter abbreviated to S, numbered 101). In other words, if a command that causes the power supply to halt by turning off the main switch is supplied to the main circuit 10 over the wiring (not shown in the figure), the main circuit 10 performs save processing. When the operation of the main circuit 10 has completely ended, the second control circuit 14 sends a power supply halt permission signal 24 to the main power supply circuit 2 to permit the main power supply circuit 2 to be turned off. In this manner, the operation of the main circuit 10 is halted by turning off the main power supply circuit 2. Note that the save processing period in this example refers to a period $T_1$ from the time that the main switch is turned off until the main circuit 10 is turned off, as shown in the timing chart of FIG. 5.

In this case, the time during which the main circuit 10 is performing this save processing is used in this example of the invention as described below. Before the main power supply circuit 2 is turned off, the auxiliary clock signal is activated and the data storage register 52 starts counting (performing a timing operation), based on this auxiliary clock signal 92 (S102). To ensure that the auxiliary clock signal 92 is halted at a fixed condition (after a predetermined period has elapsed after the halting of the main power supply circuit 2), timing data indicating that period ($T_3$ in FIG. 5) could be written to the registers 82a to 82c (see FIG. 2) within the auxiliary circuit 50, as will be described later (S103).

Note that the storage means consisting of components such as the registers 82a to 82c is preferably formed as non-volatile ROM, or the like, in which case the data (timing data) within the registers will not be lost by turning off the power supply of the auxiliary circuit 50. It is therefore possible to write timing data to the registers 82a to 82c when the power is on, then read that timing data out again when the power has been turned off then on again.

In this manner, save processing is performed within the main circuit 10 after the main switch has been turned off, and then finally the main power supply circuit 2 is turned off.

Figure 5:
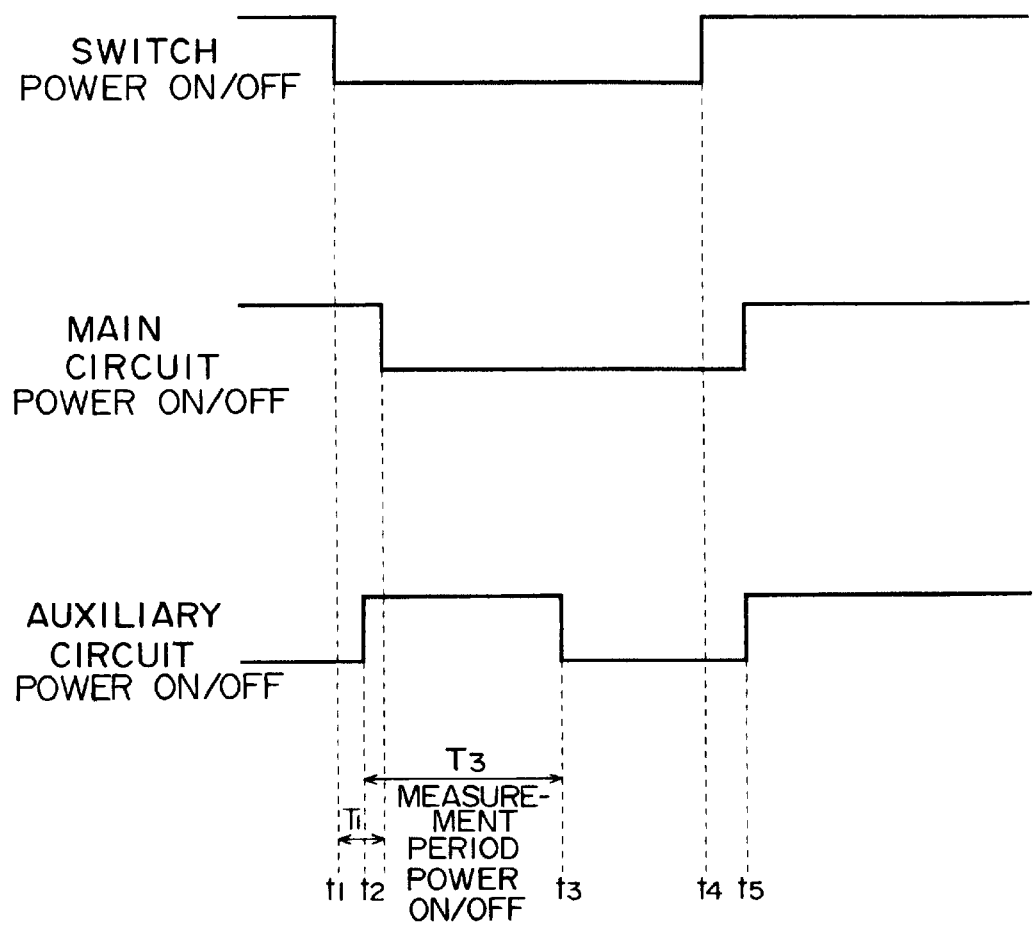
FIG. 5 is a timing chart of the operation of the main circuit and auxiliary circuit of the semiconductor integrated circuit of FIG. 1.

At the same time, the data storage register 52 within the auxiliary circuit 50 starts counting, based on the auxiliary clock signal 92, immediately before the main power supply circuit 2 is turned off, and this counting continues even after the main power supply circuit 2 has been turned off. Thus the auxiliary circuit 50 starts operating at a time point $t_2$ immediately before the main circuit 10 is turned off and continues operating during the measurement period $T_3$, as shown in FIG. 5.

If the value of the preset timing data matches the timing counter value, after a predetermined period has elapsed, the control signal generation circuit 70 generates the auxiliary clock control signal (halt signal) 95 and outputs it to the operation control circuit 60.

The operation control circuit 60 inputs the auxiliary clock control signal 95 and also inputs the counter value at the point at which the auxiliary clock control signal 95 was output (current value), as the condition determination signal 94. The operation control circuit 60 stops the auxiliary clock signal 92 and generates a signal at a fixed potential, if necessary as specified by the condition determination signal 94. This means that the auxiliary clock signal 92 can be halted automatically if circuit operation under the auxiliary clock signal 92 is not necessary, making it possible to constrain power consumption. If the main power supply circuit is not turned on during the measurement period, the auxiliary clock signal is turned off after one week has elapsed (S104).

Subsequently, if the main power supply circuit 2 of the main circuit 10 is turned on at $t_5$ in FIG. 5 (S105), based on the operation of turning the main switch on again after a further time has elapsed (at $t_4$ in FIG. 5), the auxiliary circuit 50 operates on the basis of the auxiliary clock signal 92 and the previously mentioned counter value is read out (at $t_5$ in FIG. 5) to check whether or not the auxiliary clock signal has been halted for one week or more (S106).

The main power supply circuit 2 may use a 5 V supply derived from a 100 V supply, or may have a 5 V power supply that can be separated from a board. Similarly, in the above example, the semiconductor integrated circuit 1 except for the main power supply circuit 2 and the auxiliary power supply circuit 3 was described as being all on one chip, but the configuration could also be such that each of the main power supply circuit 2 and the auxiliary power supply circuit 3 could be comprised within the semiconductor integrated circuit 1 by using a power-supply chip therefor.

In this case, a comparison is done between the count within the auxiliary circuit and that when the power is turned on, to determine whether cleaning is necessary (S107). If the main power supply circuit of the main circuit has not been turned on for a week or longer, cleaning is performed (S108). The auxiliary clock signal is activated for the fixed period for cleaning, and is then halted. Therefore, this cleaning is not done if the main power supply circuit is turned on within one week.

Thus the main system clock signal of the main circuit can be halted and the auxiliary clock signal of the auxiliary circuit can also be halted for any desired period of time, enabling a huge reduction in power consumption within the circuits in comparison with the prior art.

Concerning the Auxiliary Clock

Figure 2:
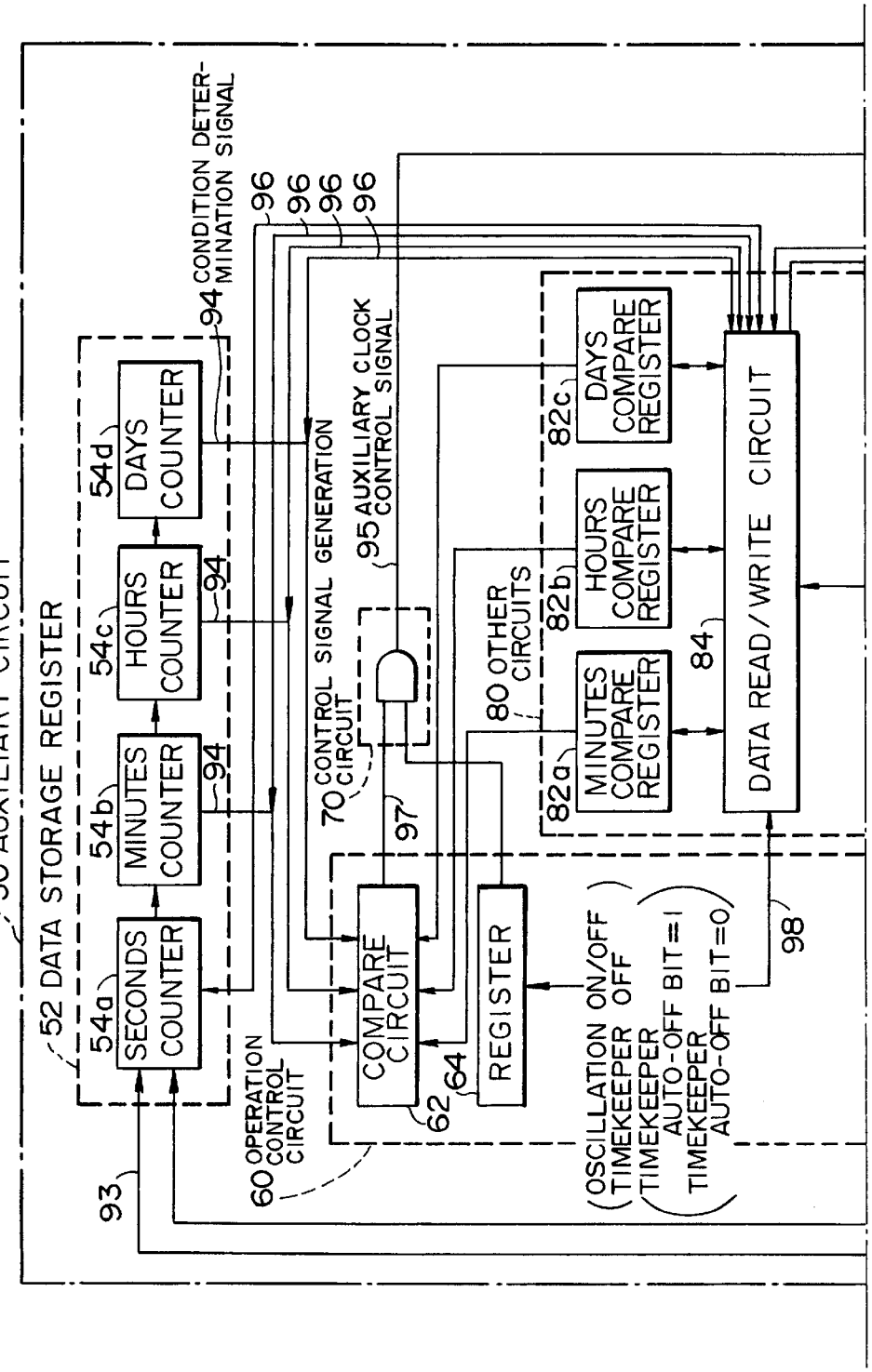
FIG. 2 is a block diagram of details of the auxiliary block of the semiconductor integrated circuit of FIG. 1.

Details of the auxiliary circuit 50 will now be described with reference to FIG. 2. As shown in FIG. 2, the data storage register 52 also functions as a signal control means for controlling the auxiliary clock signal 92, and comprises a seconds counter 54a, a minutes counter 54b, an hours counter 54c, and a days counter 54d disposed in series. The counters 54a to 54d configuring the data storage register 52 are formed to be adjustable, so that they can count up for various different purposes. Ordinarily, when they are used as a real-time clock, they are in an on-state; they are not turned off.

Even when the counter in the data storage register 52 is not incrementing, the data read/write circuit 84 can send the signals 40 and 42 to the main circuit 10 through a level shifter 34, based on an output from a register 86, by causing a clock signal from an oscillation circuit 66 to operate as a reference signal.

The operation control circuit 60 comprises a compare circuit 62 for interrupts, which counts time and generates an interrupt signal if that counter value matches; a register 64 for control that causes an auxiliary clock control signal 95 from the control signal generation circuit 70 to halt if necessary; the oscillation circuit 66, which comprises an oscillating/inverter that generates a reference signal based on a crystal oscillator x'tal; a clock dividing circuit 67; and another clock dividing circuit 68. Note that the register 64 is designed for halting the auxiliary clock control signal 95; it controls the signal in such a manner that interrupt processing is halted if a timing auto-off bit is 1, or interrupt processing is performed if that bit is 0.

The oscillation circuit 66 comprises an inverter and a NAND circuit connected to the crystal oscillator X'tal, and the oscillation circuit 66 can be halted by feedback, by turning that inverter off. The main circuit 10 is also configured with an oscillation circuit, similar to the oscillation circuit 66 of the auxiliary circuit 50.

The oscillation circuit 66, the clock dividing circuit 67, and the clock dividing circuit 68 are configured in such a manner that they can operate at a frequency for low speeds when it is desired to reduce the power consumption or they are used in sleep state. The period counters 54a to 54d are configured so that they can operate at either high speed or low speed. In addition, the main circuit 10 could be configured in such a manner that it can be switched automatically to low-speed operation if high-speed operation is not necessary, such as when waiting for processes.

The control signal generation circuit 70 is formed of a component that functions as comparison means for comparing the counter value of the data storage register 52 and the timing data in the registers 82a to 82c, such as an AND gate.

The other circuits 80 comprise serially connected timer counters that functions as a storage means (in other words, a minutes compare register 82a, an hours compare register 82b, and a days compare register 82c), the data read/write circuit 84 that functions as means for reading and writing data, and the register 86.

When the compare registers 82a to 82c are being used as an ordinary real-time clock (RTC), the compare registers 82a to 82c are set to an on-state and, if they are to be set to output a signal at 8 PM, 0 is set in the compare register 82a, 8 is set in the compare register 82b, and 0 is set in the compare register 82c. In that case, interrupt processing occurs for only the hours compare register 82b and the minutes compare register 82a, to ensure that a signal is output to the compare circuit 62 at the set time. It should be noted, however, that the compare registers 82a to 82c may be placed in an off-state, and a counter can be used instead to generate an RTC.

The interface circuit 30 comprises level shifters 34 and 36 and a NAND circuit 32 that function as voltage conversion means for converting voltages between the main circuit 10 and the auxiliary circuit 50 if the power supply voltage is different therefrom, to ensure that the main circuit 10 is driven at a voltage such as 5 V and the auxiliary circuit 50 is driven at a voltage such as 3 V. This NAND circuit 32 is preferably a circuit with an additions pull-up transistor or pull-down transistor.

It should be noted, however, that the level shifter for converting from 5 V to 3 V is not necessary if the transistors of the auxiliary circuit 50 are transistors that can also operated at 5 V, even although they are being used at 3 V. In addition, the configuration could be such that the level shifter 34 is provided for the signals 40 and 42 that enter the high-power system of the main circuit 10 from the low-power system of the auxiliary circuit 50 and the level shifter 36 is provided for the signals 44 and 46 that enter the low-power system of the auxiliary circuit 50 from the high-power system of the main circuit 10. The interface circuit 30 could equally well be incorporated into the auxiliary circuit 50.

For similar reasons, a level shifter 90 could also be provided within wiring connected to an external connection circuit for testing purposes, which is connected outside of the oscillation circuit 66.

The description now turns to the operation of the auxiliary circuit 50 configured as described above.

If a period of seven days is to be set, by way of example, the predetermined setting time during which the auxiliary circuit 50 is to be halted, such as seven days, is set in the compare registers 82a, 82b, and 82c. In other words, the data read/write circuit 84 writes data relating to that time, such as seven days, to the compare registers 82a, 82b, and 82c as 0 in the minutes compare register 82a, 0 in the hours compare register 82b, and 7 in the days compare register 82c, based on a request (the signals 44 and 46) from the main circuit 10.

The data storage register 52 starts incrementing the values in the counters 54a, 54b, 54c, and 54d, based on the signal 93 from the clock dividing circuit 68.

The start of this incrementation, in other words, the placing of the data storage register 52 in an on-state, is done at the timing set immediately before the main power supply circuit 2 of the main circuit 10 was turned off. This makes it possible to place the register 86 in a reset state before the data storage register 52 is placed in the on-state, to reset the value in the register.

A period called the save processing time of the main circuit 10, from the time the main switch is turned off until the main power supply circuit 2 goes off, is utilized for this operation of starting the incrementation together with a reset. Within a short time before the main power supply circuit 2 halts (time enough to allow the internal charging capacitor to discharge), during this save processing time, a power supply halt signal or the like is input to the auxiliary circuit 50 through the signal lines for the signals 44 and 46 from the main circuit 10, to post that the power supply is halting, the data storage register 52 is placed in an on-state by the data read/write circuit 84 and the register 86, and incrementation starts. A reset occurs at the same time. Subsequently, when the data read/write circuit 84 has verified that incrementation has been started by the switching of the register 86 to the on-state, a signal for verification such as an incrementation verification signal is sent through the signal lines for the signals 40 and 42 to the main circuit 10. When this signal for verification is input to the main circuit 10, the second control circuit 14 outputs the power supply halt signal 24 to the main power supply circuit 2, and the main circuit 10 is completely halted.

Within the oscillation circuit 66, the clock dividing circuit 67, the clock dividing circuit 68, and the data storage register 52 that function as a timer in this case, the switching on and off of the state of the data storage register 52 is controlled by the contents of the register 86 as timer control means. In other words, the data storage register 52 is placed in an off-state by turning off the register 86, and the data storage register 52 is placed in an on-state by turning on the register 86, using the clock that is always used to maintain the operation for timing.

In addition, the counter value at the point at which the auxiliary circuit 50 is turned off is placed in the counters 54a and 54d and also power is still supplied from the external auxiliary power supply circuit 3, so that the incremented count is not erased even when the auxiliary circuit 50 is in a static state and the data storage register 52 is in an off-state. The count of the data storage register 52 can be erased by resetting the register 86.

In this case, the compare circuit 62 compares the counter value held by the data storage register 52 and the contents that have been written to the registers 82a, 82b, and 82c, and outputs an interrupt signal 97 if those contents match the counter value (if seven days have elapsed). The control signal generation circuit 70 compares the interrupt signal 97 and digital data from the register 64.

The register 64 is designed to halt the auxiliary clock control signal 95; when the timing auto-off bit (mode) is zero, the interrupt signal 97 is output as the auxiliary clock control signal 95, and interrupt processing starts.

If the data storage register 52 has been set to the off-state, the control signal generation circuit 70 causes the oscillation circuit 66 and the clock dividing circuit 68 to halt by outputting the auxiliary clock control signal 95. In this case, the control signal generation circuit 70 is configured of components such as an AND gate, so can perform the above described operation.

When the oscillation circuit 66 is halted, the inverter/oscillator portion of the oscillation circuit 66 and the clock dividing circuit 68 both stop operating, and also the input of the auxiliary clock control signal 95 to the register 86 causes the register 86 to put the data storage register 52 in the off-state to automatically halt the incrementation.

When the data storage register 52 is again placed in the on-state by turning on the main power supply circuit 2 of the main circuit 10, the counter value in the data storage register 52 is output so that the elapsed time is known.

If the data storage register 52 has been set to the off-state, the control signal generation circuit 70 causes the oscillation circuit 66 and the clock dividing circuit 68 to halt by outputting the auxiliary clock control signal 95. In this case, the control signal generation signal 70 is configured of components such as an AND gate, so can perform the above description operation.

When the oscillation circuit 66 is halted, the inverter/oscillator portion of the oscillation circuit 66 and the clock dividing circuit 68 both stop operating, and also the input of the auxiliary clock control signal 95 to the register 86 causes the register 86 to put the data storage register 52 in the off-state to automatically halt the incrementation.

When the data storage register 52 is again placed in the on-state by turning on the main power supply circuit 2 of the main circuit 10, the counter value in the data storage register 52 is output so that the elapsed time is known.

If the auxiliary circuit 50 is placed in the halt state then the power of the main power supply circuit 2 is turned on again by operating the main switch, the main circuit 10 again goes into the operating state.

In this case, if the power is turned on after at least seven days have elapsed, by way of example, a desired operation such as cleaning is performed; if the elapsed time is less than seven days, a signal used when determining whether or not a cleaning is to be performed is output as the signal 40 from the data read/write circuit 84 to the main circuit 10.

It is thus possible to determine whether cleaning is required, by reading the contents of the counters 54a to 54d when the power supply is turned on again.

As described above, this embodiment of the invention makes it possible to implement halting of the auxiliary circuit 50, without involving the interface circuit 30 or the interface signals 40, 42, 44, and 46 of the main circuit 10. Since the measurement has to be done only for a predetermined required period after the main circuit has halted, power consumption can be reduced by simply timing the necessary period.

Concerning the Main Circuit

The description now turns to a detailed example of the main circuit. A specific function block diagram of the main circuit is shown in FIG. 3. In FIG. 3, a microprocessor 10 is a 32-bit microprocessor and comprises a CPU (including a control circuit, sum-of-products operation circuit, ALU) 100; a ROM 151; a RAM 150; a high-frequency oscillation circuit 180; a low-frequency oscillation circuit 181; a reset circuit 182; a prescaler 170; timer circuits such as a 16-bit programmable timer 183, a 8-bit programmable timer 184, and a clock timer 185; data transfer control circuits such as an intelligent DMA 169 and a high speed DMA 168; an interrupt controller 112; a serial interface 161; a bus control unit (BCU) 160; analog interface circuit such as an A/D converter 163 and a D/A converter 164; and I/O circuits such as in input port 165, an output port 166, and an I/O port 167; as well as various buses 172 and 173 connecting all the components together, and pins 171.

This microprocessor, which is formed on a single semiconductor substrate, is a RISC microprocessor capable of manipulating 32-bit data. It employs an architecture using pipeline and load-and-store methods, wherein substantially all instructions are executed within one clock period. All the instructions are described within a fixed 16-bit length, which ensures an extremely small instruction code size.

The CPU has a dedicated stack pointer (SP) register, and decodes and executes dedicated stack pointer instructions. This CPU, of a configuration that will be described later, functions as instruction decoding means, instruction read means, and instruction execution means.

Thus circuits outside the CPU, specifically those using expansion portions provided within the bus control unit, can not only take processing data that has been read from RAM and zero-expand or sign-expand it to 32 bits, but can also take 8-bit or 16-bit processing data that is stored in the registers within the CPU, zero-expand or sign-expand it to 32 bits if necessary. then store it within a desired register.

In particular, this expansion of processing data makes it possible to read out data and expand it, as described above, by execution within one instruction cycle, with a processing speed similar to that if the expansion portions were provided within the CPU. Since this enables a compression of the code size in comparison with the prior art, it makes it possible for on-chip ROM to be used more efficiently, for example. In addition, it is able to save the register's data and to reload the data to the register efficiently, and also interrupt processing and subroutine call/return processing can be performed at high speed.

This example of the invention concerned the execution of sum-of-products operation in a sum-of-products operation circuit, where the number of times the operation is executed is specified on the basis of number of executions information comprised within the sum-of-products operation instruction.

A block diagram of a microprocessor incorporating a sum-of-products operation circuit 110 is shown in FIG. 6. The microprocessor in FIG. 6 processes 32-bit data. The sum-of-products operation circuit 110 multiplies first and second sum-of-products input data items MDA and MDB, each of 16 bits, and adds the 32-bit result of this multiplication to a 64-bit MAC register 113.

The microprocessor of FIG. 6 comprises a control circuit 100-1 for processing 32-bit data, a bus control unit (BCU) 160 that controls a bus connecting the microprocessor and a memory 150, the sum-of-products operation circuit 110 that executes the sum-of-products operation, an interrupt controller 162 that accepts various interrupts from within and outside the microprocessor and issues interrupt requests to the control circuit 100-1, and an arithmetic and logic unit (ALU) 108 that performs arithmetic operations such as additions and subtractions on data, as well as logical operations such as ORs, ANDs, and logical shifts thereon.

In this case, the control circuit 100-1 performs control for receiving instructions comprising a sum-of-products operation instruction, analyzing the thus-received instructions, and executing the analyzed instructions, and uses 16-bit instructions. The control circuit 100-1 also comprises general-purpose registers 101 consisting of sixteen 32-bit registers R0 to R15, and a program counter (PC) 102. The sum-of-products operation circuit 110 executes the sum-of-products operation and the ALU 108 executes arithmetic and logical operations under the control of the control circuit 100-1. The control circuit 100-1, the sum-of-products operation circuit 110, and the ALU 108 together function as a central processing unit (CPU) for the microprocessor 100.

The control circuit 100-1, the BCU 160, and the sum-of-products operation circuit 110 transfer data over an internal data bus. The BCU 160 uses an external address bus and external address bus to read the first and second sum-of-products input data items MDA and MDB from the memory 150.

The product-sum operation circuit 110 comprises a TEMPm register 131 and a TEMPa register 132 for temporarily holding the first and second sum-of-products input data items MDA and MDB, a multiplier 111 for multiplying the temporarily held MDA and MDB items, an adder 112-1 for adding the result of this multiplication, and a 64-bit MAC register (a register for the sum-of-products result) 113 for holding the addition result. The product-sum operation circuit 110 takes the 16-bit MDA and MDB items as inputs, adds the result of their multiplication to the contents of the MAC register 113, then stores the result of that addition in the MAC register 113.

The operation of the above circuitry will now be described. Before the execution of the sum-of-products operation instruction, a first region in memory contains a first sum-of-products input data item MDA0 to MDAL and a second memory region contains a second sum-of-products input data item MDB0 to MDBL. The start addresses of the first and second regions are loaded into registers Rm and Rn within the general-purpose registers 101, so that the Rm and Rn point to the start data items MDA0 and MDB0. The number of times the sum-of-products operation is to be executed is loaded into a register Ro within the general-purpose registers 101, and also the MAC register 113 is initialized. IF the control circuit 100-1 receives a sum-of-products operation instruction during this state, it performs various processes for executing the sum-of-products operation instruction, under the control of the control circuit 100-1 that analyzes this sum-of-products operation instruction The control circuit 100-1 that performs the processing described above makes it possible to execute the sum-of-products operation a desired number of times, by controlling other components such as the sum-of-products operation circuit 110, the BCU 160, and the ALU 108.

Since this example thus makes it unnecessary to write a program that repeats the sum-of-products operation instruction to fulfill the desired number of executions or a program that decrements the number of executions and determines whether or not the number of executions has reached zero, it is possible to execute a sum-of-products operation a desired number of times with a single sum-of-products operation instruction, while implementing a more efficient code size, a smaller memory for storing instructions, and faster processing speed. This example also makes it unnecessary to fetch the sum-of-products operation instruction repeatedly during the execution of the sum-of-products operation. It is therefore possible to avoid delays in the execution of the sum-of-products operation instruction caused by conflicts between the reading of the sum-of-products input data and the fetching of the sum-of-products operation instruction, thus enabling a reduction in power consumption that would be caused to superfluous fetches.

Various other embodiments could be considered as examples of a sum-of-products operation instruction wherein the number of executions of the sum-of-products operation is specified. For example, the sum-of-products operation instruction could comprise a 6-bit operation code for indicating the sum-of-products operation instruction from said a plurality of instructions and a 4-bit operand indicating the register Rc from among the sixteen general-purpose registers. This makes it possible to constrain the instruction length to within 16 bits, making the code size more efficient and reducing the number of memory required for storing instructions.

Details of Control Circuit

FIG. 6 is a block diagram of a detailed example of the control circuit 100-1, the sum-of-products operation circuit 110, and the ALU 108.

The CPU of this example employs an architecture using pipeline and load-and-store methods, wherein substantially all of the instructions are executed within one cycle. All the instructions are described within a fixed 16-bit length, which ensures that instructions handled by the CPU of this example have an extremely small object code size.

In particularly, the CPU of this example is provided with a dedicated stack pointer register for efficiently executing the processing for handling the stack pointer, and is constructed so as to be able to decode and execute a dedicated stack pointer instructions set having object code that specifies this dedicated stack pointer register as an implicit operand.

FIG. 6 will now be used in a description of the circuit configuration of the CPU of this example. This CPU 100 comprises a register set including the general-purpose registers 101, the PC 102 containing the program counter, a processor status register (PSR) 103, and an SF 104 which is a dedicated stack pointer register; an instruction decoder 105; an immediate value generator 106; an address adder 107; the ALU 108; a PC incrementer 109; various internal buses; and various internal signal lines.

In FIG. 6, I_DDR_BUS denotes an instruction address bus and I_DATA_BUS denotes an instruction data bus. These buses are used for reading instructions such as the sum-of-products operation instruction form a memory 150-1. Similarly, D_ADDR_BUS denotes a data address bus and D_DATA_BUS denotes a data bus, where these buses are used for reading first and second sum-of-products input data items MDA and MDB from a data memory 150-2. Thus this example employs a bus configuration know as the Harvard architecture.

PA_BUS, PB_BUS, WW_BUS, and KA_BUS denote internal buses, and AUK_BUS denotes a bus for exchanging data between the control circuit 100-1 and the sum-of-products operation circuit 110. IA and DA denote signal liens for outputting addresses from the control circuit 100-1 (CPU) to the I_ADDR_BUS and D_ADDR_BUS. DIN denotes a signal line for inputting data from the D_DATA_BUS to the control circuit 100-1 and DOUT denotes a signal line for outputting data from the control circuit 100-1 to the D_DATA_BUS.

The instruction decoder 105 accepts an instruction that is input from I_DATA_BUS, and also analyzes it, then outputs various control signals that are necessary for executing the instruction. It issues various directives, depending on the instructions, through the immediate value generator 106 to the parts of the control circuit 100-1, by way of example. If an interrupt is received from the interrupt controller 162 (see FIG. 3), it outputs TRAP VECTOR for activating the interrupt handler to the D_ADDR_BUS and also activates a TRAP signal (makes it 1) to inform the sum-of-products operation circuit 110 that an interrupt has occurred. If a sum-of-products operation instruction is received, it activates a mac signal to inform the sum-of-products operation circuit 110 that a sum-of-products operation instruction has been issued.

The immediate value generator 106 generates 32-bit immediate value data to be used during the execution of the instruction, based on an immediate value comprised within the instruction, and creates 0, −1, ±2, and ±4 constant data that is necessary for the execution of each instruction. The PC incrementer 109 increments the value in the PC 102 every time one instruction is executed. The address adder 107 uses information stored in the registers and the immediate value data generated by the immediate value generator 106 to perform an addition, and generates the address necessary for reading data from the memory 150.

The general-purpose registers 101 comprise sixteen 32-bit registers R0 to R15. The SP 104 is a dedicated 32-bit stack pointer register, containing the stack pointer which indicates the start address of the stack. The processor status register (PSR) 103 is a 32-bit registers used for holding various flags.

The ALU 108 is designed to perform arithmetic and logical operations and in this example it also decrements the number of executions. If the processing result of the ALU 108 is zero, a zero detector 133 activates ALU_zero (makes it 1). This causes a zero flag in the PSR 103 to be set and also informs the sum-of-products operation circuit 110 that the number of executions has reached zero. A bus multiplexer 130 selects one of the PA_BUS, PB_BUS, and WW_BUS and connects it to the AUX_BUS. The bus multiplexer 130 comprises the TEMPm register 131 and the TEMPn register 132 and, when both of the first and second sum-of-products input data items MDA and MDB are available therein, it outputs that data to the sum-of-products operation circuit 110.

The sum-of-products operation circuit 110 comprises a state machine 114. This state machine 114 controls the state of the sum-of-products operation circuit 110, based on various signals such as ALU_zero, trap, and mac.

MAC state (MAC0 to MAC8) denotes the state of the sum-of-products operation circuit 110 (the state machine 114), with transitions between the various states occurring as described below:

1. mac: Signal that becomes active (1) when the instruction decoder 105 accepts a sum-of-products operation instruction.

2. mac_end: Signal that becomes 1 when an end condition of the sum-of-products operation instruction is satisfied, more specifically when mac_zero or mac_trap becomes 1.

3. mac_zero: Signal that becomes 1 when the number of executions of the sum-of-products operation reaches zero. In this case, mac_zero becomes 0 when the microprocessor has been reset or the MAC state goes to MAC8 or MAC9. In addition, it becomes 1 if the ALU_zero signal from the zero detector 133 becomes 1 when the MAC state is MAC3, MAC5 or MAC7.

4. mac_trap: Signal that becomes 1 if an interrupt occurs during the execution of the sum-of-products operation instruction. In this case, mac_trap becomes 0 when the microprocessor has been reset or the MAC state goes to MAC8 or MAC9. In addition, it becomes 1 if the trap signal from the instruction decoder 105 becomes 1 when the MAC state is MAC5 or MAC7.

If the mac signal is zero but the sum-of-products operation instruction has not been executed, the MAC state remains at MAC0. On the other hand, if the mac signal is 1, the MAC state becomes MAC1. An unconditional transition (UCT) occurs from MAC1 to MAC2 and from MAC2 to MAC3 in synchronization with the clock.

If mac_end is 1 at MAC3 the state changes to MAC9 and also mac_end is reset to zero. After a transition to MAC9, the state returns to MAC1 if the mac signal is 1 or to MAC0 if the mac signal is 0. On the other hand, if the mac-end signal is zero, the state changes from MAC3 to MAC4.

An unconditional transition occurs from MAC4 to MAC5 in synchronization with the clock. Since the number of executions is decremented at this point, it is possible that mac_zero will become 1. In such a case, it is determined whether or not mac-end is 1 when the state is MAC5 and, if it is 1, the state changes to MAC8 then returns from MAC8 to MAC0 or MAC1. If mac-end is 0, on the other hand, the state changes from MAC5 to MAC6.

An unconditional transition occurs from MAC6 to MAC6 in synchronization with the clock. Since the number of executions is decremented at this point, it is possible that mac_zero will become 1. In such a case, it is determined whether or not mac-end is 1 when the state is MAC7 and, if it is 1, the state changes to MAC8; alternatively, if it is 0, the state returns to MAC6.

If, for example, the number of executions of the sum-of-products operation had been set to zero, the MAC state changes first to MAC0, then to MAC1, MAC2, and MAC3. Since mac_end has become 1 (mac_zero=1), the state then changes from MAC3 to MAC9 and then MAC0 (or MAC1).

If the number of executions has been set to 1, the MAC state changes from MAC0, to MAC1, MAC2, MAC3, and then MAC4. Since the number of executions is decremented at the point at which a transition occurs from MAC4 to MAC5, it is possible that mac_zero will become 1. As a result, the MAC state is set to change from MAC4 to MAC5, MAC8, and then MAC0 (or MAC1).

If the number of executions has been set to 2, the MAC state changes from MAC0, to MAC1, MAC2, MAC3, MAC4, MAC5, MAC6, MAC7, MAC8, and then MAC0 (or MAC1). In other words, the number of executions is decremented to zero during the transitions from MAC4 to MAC5 and from MAC6 to MAC7 in this case. Note that if the number of executions is 3 or more, an operation that changes the state from MAC6 to MAC7 then returns it to MAC6 is repeated until the number of executions reaches zero.

If an interrupt request has occurred, it is determined whether or not mac_trap has become 1 (mac_end×1) when the state first reaches MAC5 or MAC7, then the state changes to MAC8.

One characteristic of the state machine 114 of this example is that the MAC state returns to the initial state MAC0 (or MAC1), based on the mac_end signal going active when the sum-of-products operation has ended the desired number of times (mac_zero=1) or when an interrupt request has occurred (mac_trap=1). This makes it possible to utilize the state transition used when the sum-of-products operation has ended the desired number of times to implement a state transition that occurs when an interrupt request has occurred. It also makes it possible to simplify the structure of the state machine 114.

Embodiment 2

A block diagram of a semiconductor integrated circuit of this invention that is capable of separating the data storage register is shown in FIG. 7. The main circuit is configured in a similar manner to that of Embodiment 1, so it is omitted from FIG. 7.

A semiconductor integrated circuit 200 in this case comprises the main circuit (not shown in the figure), a first auxiliary circuit 210, a second auxiliary circuit 230 that receives an auxiliary clock signal 260 with the objective of providing a function such as timing that is similar to that of Embodiment 1, and an interface circuit 220 that acts as input-output means interposed between first and second auxiliary circuits 210 and 230. In other words, this example is configured in such a manner that the auxiliary circuit of Embodiment 1 is divided into the first auxiliary circuit 210 and the second auxiliary circuit 230.

The first auxiliary circuit 210 consists of a data storage register 212 for counting the period during which the auxiliary clock signal 260 is operating and for outputting the thus-counted value to an operation control circuit 232.

The second auxiliary circuit 230 comprises the operation control circuit 232 that controls the halting of operation of the auxiliary clock signal 260, based on an auxiliary clock control signal 265 in a similar manner to Embodiment 1; a control signal generation circuit 234 that generates the auxiliary clock control signal 265 for controlling the halting/non-halting of the auxiliary clock signal 260; and other circuits 236 including setting means for setting the halt period of the auxiliary clock signal 260, based on a request from the main circuit.

When the counter value reaches the halt period in this case, the operation control circuit 232 causes the output of the auxiliary clock control signal 265 of the control signal generation circuit 234, to halt the auxiliary clock signal 260.

Within the second auxiliary circuit 230 are a signal 268 which is transferred by an electrical connection between other circuits 236 and the operation control circuit 232, a signal 267 which is transferred by an electrical connection between the control signal generation circuit 234 and the operation control circuit 232, and the auxiliary clock control signal 265 which is output from the control signal generation circuit 234 to the operation control circuit 232.

In addition, there are condition determination signals 263 and 264 which are output from the data storage register 212 of the first auxiliary circuit 210, through the interface circuit 220, to the operation control circuit 232; signals 261 and 262 which are output from the operation control circuit 232, through the interface circuit 220, to the data storage register 212; and signals 266 and 269 which are output from the control signal generation circuit 234, through the interface circuit 220, to the data storage register 212.

The semiconductor integrated circuit 200 also comprises an auxiliary power supply circuit 250 that is external to the semiconductor integrated circuit, for operating the circuits by supplying a voltage to the first and second auxiliary circuits 210 and 230, and a control circuit 240 connected to the second auxiliary circuit 230, for controlling the auxiliary power supply circuit 250. The control signal generation circuit 234 outputs to the control circuit 240 a control signal 270 for controlling the control circuit 240. This control circuit 240 functions to halt the supply of a potential to the second auxiliary circuit 230.

The interface circuit 220 is designed to transfer data between the data storage register 212, the operation control circuit 232, and the control signal generation circuit 234 and it mainly functions to adjust voltages between the first auxiliary circuit 210 and the second auxiliary circuit 230 so it preferably comprises components such as level shifters.

Another interface circuit for adjusting voltages between the second auxiliary circuit 230 and the main circuit (not shown in the figure) is also provided, in a similar manner to that of Embodiment 1.

In this example, the operation control circuit 232 halts the auxiliary clock signal 260 and generates a signal of a fixed potential, based on the auxiliary clock control signal 265 generated from the control signal generation circuit 234 and the condition determination signals 263 and 264 from the data storage register 212. The control signal generation circuit 234 writes the data to be retained into the data storage register 212 by the signals 266 and 269, and also generates the control signal 270 for potential supply and halts the supply of potential from the auxiliary power supply circuit 250 to the second auxiliary circuit 230. During this time, the supply of potential from the auxiliary power supply circuit 250 to the first auxiliary circuit 210 continues. In this case, tansistors of a first conductivity type that forms each of the first auxiliary circuit 210 and the second auxiliary circuit 230 are separated electrically from each other, so no problem is caused by the independent supply of power to the first and second auxiliary circuits 210 and 230.

This means that the auxiliary clock signal 260 can be halted automatically if circuit operation under the auxiliary clock signal 260 is not necessary in the semiconductor integrated circuit of this example, and also makes it possible to halt the supply of potential. In addition, the second auxiliary circuit 230 alone can be halted, without halting the supply of power to the first auxiliary circuit 210 comprising the data storage register 212. This ensures that the data storage register 212 does not lose the data that is stored therein when the power supply is halted, so that the loss of stored data can be prevented without using a special non-volatile ROM or the like in the configuration.

Thus the power consumption of the second auxiliary circuit 230 can be removed, while retaining the necessary data.

The configuration could also be such that both the power supply to the second auxiliary circuit 230 is halted and also the power supply to the first auxiliary circuit 210 is halted, by controlling the auxiliary power supply circuit 250. In such a case, it is possible to constrain the power consumption of the first auxiliary circuit 210 as well. Either of the blocks of the first and second auxiliary circuits 210 and 230 can supply the interface circuit 220 with potentials. In addition, the above described effects can be achieved even with a configuration in which the interface circuit 220 is not provided.

Embodiment 3

Figure 8:
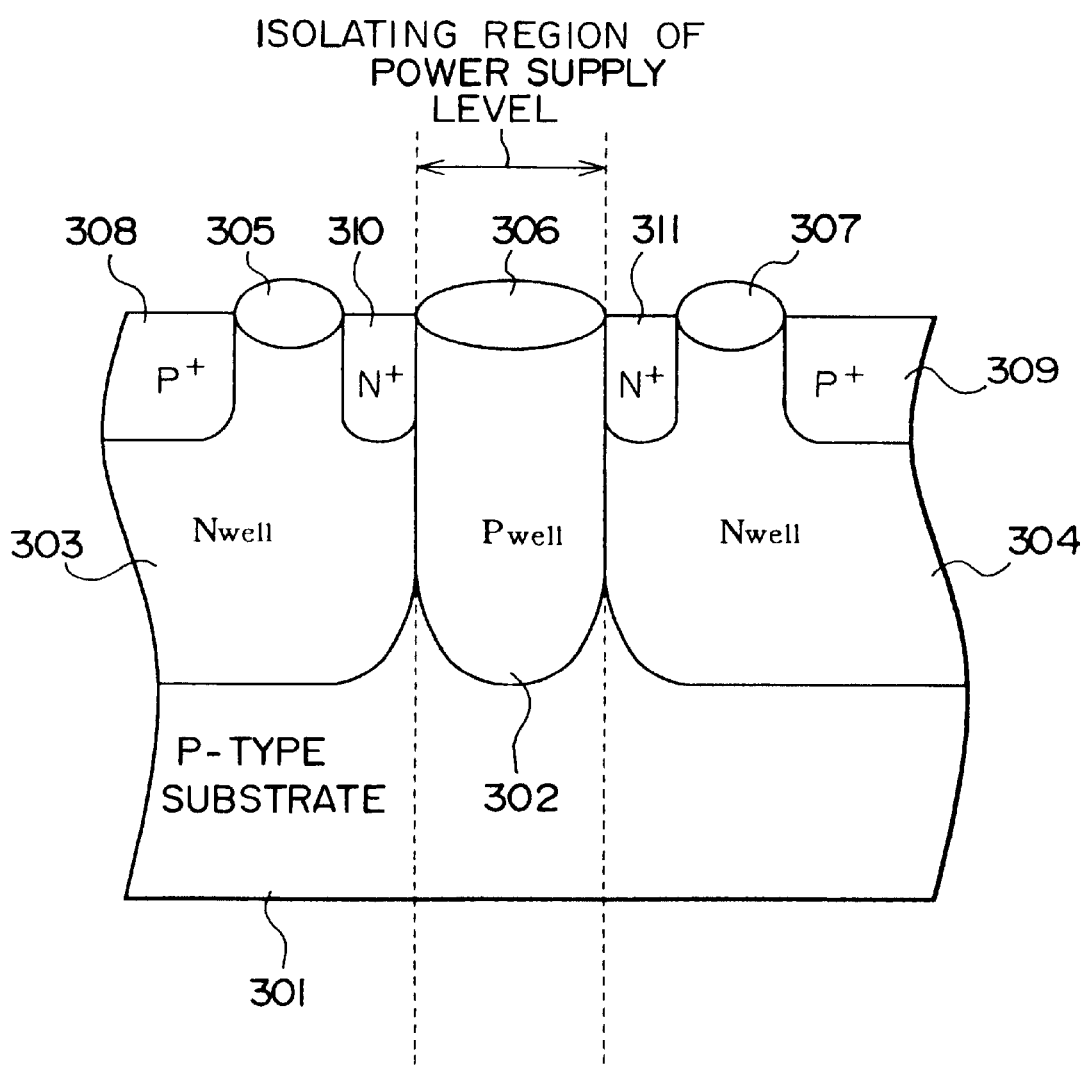
FIG. 8 is a cross-sectional view of an example of still another embodiment of the semiconductor integrated circuit in accordance with this invention.

A cross-sectional view through the semiconductor integrated circuit of Embodiment 2, in which the first auxiliary circuit and the auxiliary power supply circuit can be separated, is shown in FIG. 8. This example illustrates a case in which a semiconductor substrate 301 is a P-type substrate.

FIG. 8 illustrates a state in which the first auxiliary circuit and the second auxiliary circuit are separated by a well, to prevent any current from flowing. In other words, each of the operation control circuit 232, the control signal generation circuit 234, and the other circuits 236 all comprised in the second auxiliary circuit 230, as shown in FIG. 7 and described in the section of Embodiment 2, comprises a transistor of a first conductivity type and a transistor of a second conductivity type opposite to that of the first conductivity type.

The first auxiliary circuit 210 that comprises the data storage register 212 also comprises a transistor of a first conductivity type and a transistor of a second conductivity type opposite to that of the first conductivity type.

The configuration is such that the transistor of the first conductivity type within the data storage register 212 is separated electrically from the transistors of the first conductivity type within the operation control circuit 232, the control signal generation circuit 234, and the other circuits 236. On the other hand, the transistor of the second conductivity type within the data storage register 212 is connected electrically to the transistors of the second conductivity type within the operation control circuit 232, the control signal generation circuit 234, and the other circuits 236.

This configuration makes it possible to supply potentials independently to the data storage register 212 and to the operation control circuit 232, the control signal generation circuit 234, and the other circuits 236.

In this example, an N well layer 303, a P well layer 302 acting as an isolating region of power supply level, and an N well layer 304 are formed on the P-type substrate 301, as shown in FIG. 8.

An $N^{30}$ diffusion layer 310 (substrate contact region), a $P^-$ diffusion layer 308 (transistor region of the first conductivity type), and a field oxide film 305 placed between the $N^-$ and $P^{30}$ diffusion layers are provided within the N well layer 303.

Another field oxide film 306 is formed within the region of the P well layer 302.

An $N^+$ diffusion layer 311 (substrate contact region), a $P^+$ diffusion layer 309 (transistor region of the first conductivity type), and a field oxide film 307 placed between the $N^+$ and $^+$ diffusion layers are provided within the region of the N well layer 304.

The N well layer 303 and the $N^+$ diffusion layer 310 form part of an N-channel (first conductivity type) transistor of the first auxiliary circuit 210.

Similarly, the N well layer 304 the $N^+$ diffusion layer 311 form part of an N-channel (first conductivity type) transistor of the second auxiliary circuit 230.

The above described configuration ensures that the P well layer 302 acts as an isolating region of power supply level by providing the P well layer 302 between the N well layer 303 and the N well layer 304, so that the N well layers 303 and 304 are independent.

Therefore, potentials can be supplied independently to the transistors of the first conductivity type of the circuits disposed within the N well layers 303 and 304, so that a potential can be supplied to the first auxiliary circuit 210 of FIG. 7 alone, the supply of potential can be halted to the second auxiliary circuit 230 whose operation is not required, and thus power consumption by unneeded circuits can be removed.

In the above described embodiment, the provision of a first auxiliary circuit and a second auxiliary circuit in a semiconductor integrated circuit having a plurality of auxiliary clock signals makes it possible to halt the auxiliary clock signal for the second auxiliary circuit, when that auxiliary clock signal is not in use, to constrain the power consumption.

In addition, the provision of a first auxiliary circuit comprising a data storage register and a second auxiliary circuit comprising an operation control circuit and a control signal generation circuit, where these auxiliary circuits are separated electrically from each other and the first auxiliary circuit is also separated from the auxiliary power supply circuit, makes it possible to stop the supply of potential to the second auxiliary circuit, which does not need to operate when the auxiliary clock signal is not in use, and thus constrain the power consumption while retaining data in the data storage register. Note that, although the description of this example concerned the formation of various layers on a P-type substrate, the configuration could equally well be such that an N well layer is formed between two P well layers on an N-type semiconductor substrate, in a similar manner to that described above, so that the N well layer acts as an isolating region of power supply level. More specifically, a region comprising one P well layer is formed as one part of a P-channel (second conductivity type) transistor of the first auxiliary circuit, and a region comprising another P well layer is formed as part of a P-channel (second conductivity type) transistor of the second auxiliary circuit.

Embodiment 4

Figure 9:
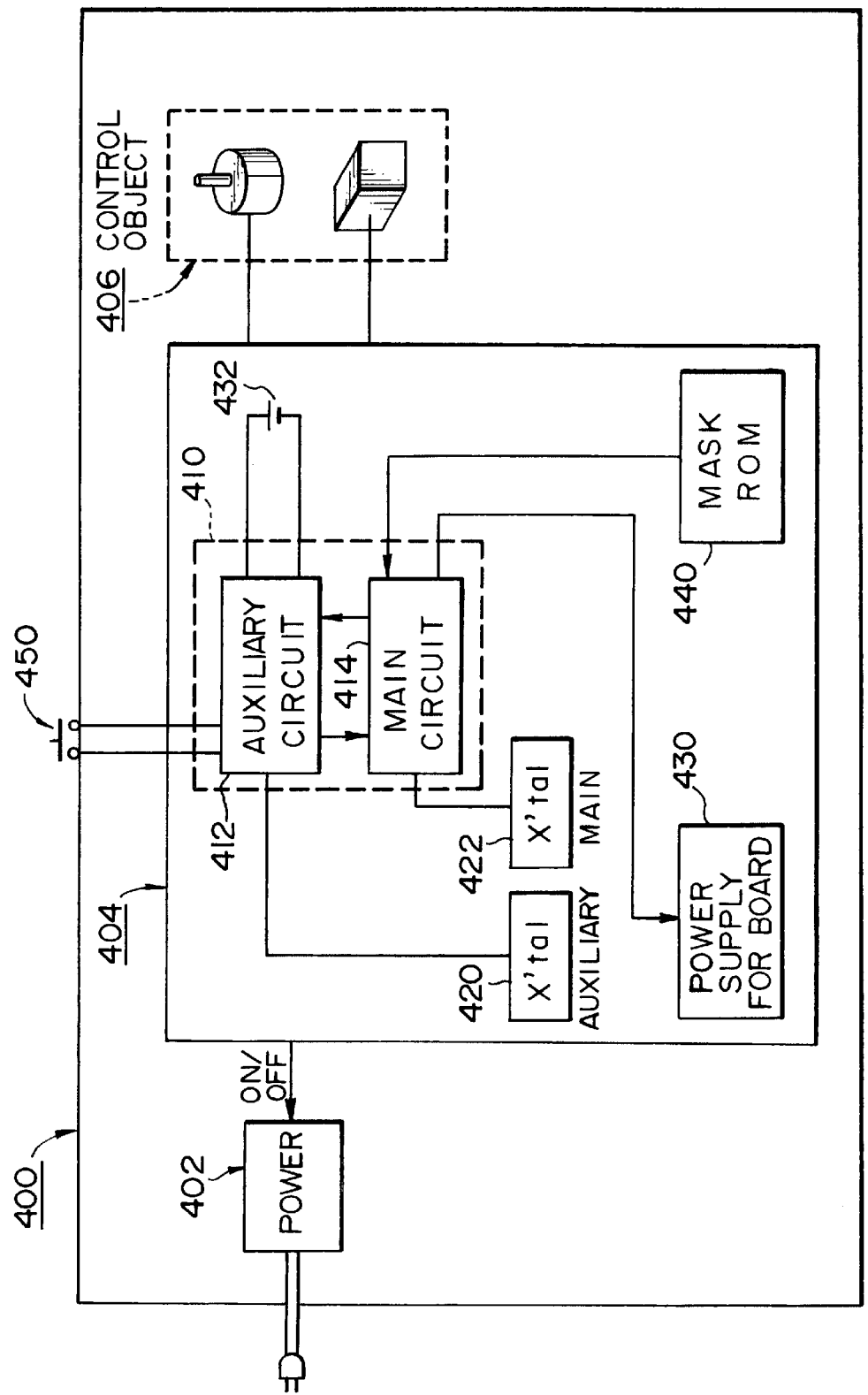
FIG. 9 is a block diagram of the overall configuration of an example of a device that uses the semiconductor integrated circuit of this invention.

An embodiment of electronic equipment that uses the above semiconductor integrated circuit will now be described, with reference to FIG. 9. FIG. 9 is a block diagram of an example of the application of the above semiconductor integrated circuit to electronic equipment, such as a printer.

In this figure, electronic equipment 400 mainly comprises a 100-V power supply 402 for powering the entire system of the electronic equipment that is tied to 100 V, by way of example, a board 404 which is connected electrically to the power supply 402 and on which is mounted a CPU comprising the above described semiconductor integrated circuit, and a control object 406 which is connected electrically to the board 404.

The board 404 comprises a CPU 410 having a main circuit 414 and an auxiliary circuit 412; a crystal oscillator X'tal) 420 (first oscillation circuit) for timing, for generating an auxiliary clock signal that is linked to the auxiliary circuit 412; a crystal oscillator (X'tal) 414 (second oscillation circuit) for the main circuit, for generating a main system clock signal that is linked to the main circuit 414; an auxiliary power supply circuit 432 for supplying power to the auxiliary circuit 412; a power supply for board 430 (dedicated power supply for the substrate) which is the main power supply circuit for supplying power to the main circuit 414; a mask ROM 440 connected to the main circuit 414; a main switch 450 which is connected electrically to the CPU 410, for switching the entire electronic equipment system on and off; and other ICs. It is preferable that all of the above components are formed on the same substrate.

Examples of the control object 406 that could be cited include a printer head and a stepping motor that is used as a drive.

In addition, a program is stored within the mask ROM 440, for reading out timing data from the mask ROM 440 to the main circuit 414 when power is turned on.

The operation of the electronic equipment 400 of the above configuration will now be described.

If the main switch 450 is turned off while the main circuit 414 is operating, the main circuit 414 goes into a save state and turns the power supply for board 430 off. When the save processing for the board 404 has ended, the power supply halt permission signal is output from the board 404 to the power supply 402, and the power supply, 402 turns off.

In this case, the auxilliary clock signal from the crystal oscillator 420 is activated before the power supply for board 430 is turned off, to activate the auxiliary circuit 412. A count starts within the auxiliary circuit 412, for measuring a specific period, such as one week. In addition, timing data relating to a halt period after the desired period has elapsed, such as data for one week, is written to the mask ROM 440 during the save process. If the main power supply circuit is not turned on within the measurement period, the auxiliary clock signal is halted at the point at which one week has elapsed.

When the power supply 402 and the power supply for board 430 are turned on by turning on the main switch 450, the count is read out to determine whether or not the auxiliary clock signal has been halted for at least one week. In other words, a power-on reset is performed and timing data within the mask ROM is read.

In this case, the system can determine whether or not cleaning is required when the power is turned on again by comparing the count in the auxiliary circuit 412 with the predetermined value. Cleaning is done if the power supply for the board has not been turned on for at least a week. Thus, although there is no problem when a printer such as this electronic equipment 400 is in use, it is possible that ink will dry up if the printer is not used for at least a predetermined time, so that cleaning must be done when the power supply for board 430 is turned on again.

The auxiliary clock signal operates the auxiliary circuit for a fixed period for the cleaning, then is halted. Therefore, cleaning is not performed if the power supply for board 430 has been turned on within the previous week.

Since this ensures that the main system clock signal of the main circuit can be halted and the auxiliary clock signal of the auxiliary circuit can also be halted for a desired period of time, it is possible to reduce power consumption within the circuitry to a greater level than in the prior art.

Embodiment 5

An embodiment of electronic equipment using the above circuit will now be described with reference to FIGS. 10 and 11.

This is an example of electronic equipment that comprises a microprocessor. The previously described semiconductor integrated circuit, a first power supply circuit that creates a voltage to be supplied to the main circuit of the semiconductor integrated circuit, and a second power supply circuit that creates a voltage to be supplied to the auxiliary circuit of the semiconductor integrated circuit are all formed on the same substrate.

Figure 10:
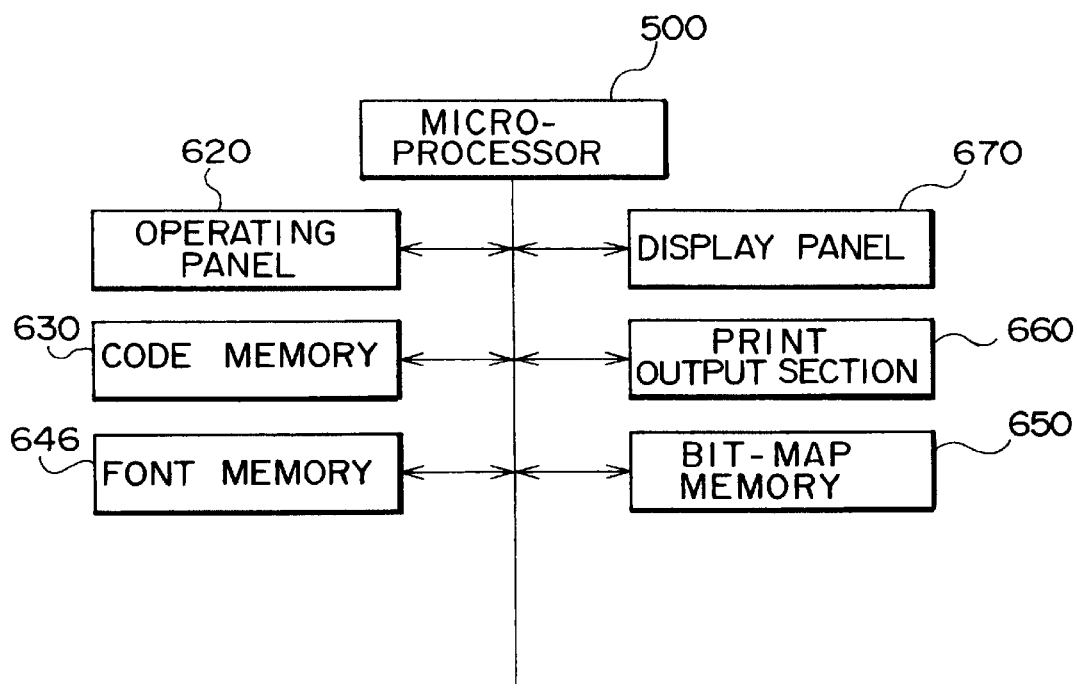
FIG. 10 is an example of an internal block diagram of electronic equipment comprising the semiconductor integrated circuit of this invention.
Figure 11:
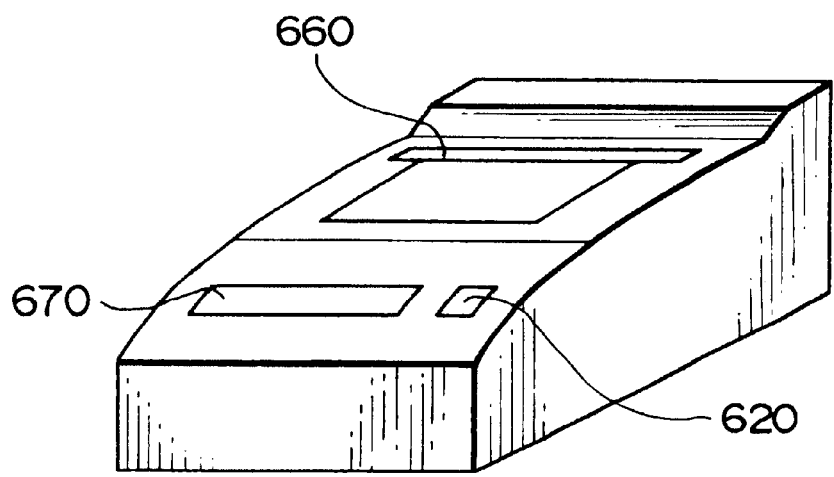
FIG. 11 is a perspective view of an example of the electronic equipment of FIG. 10.
Figure 12:
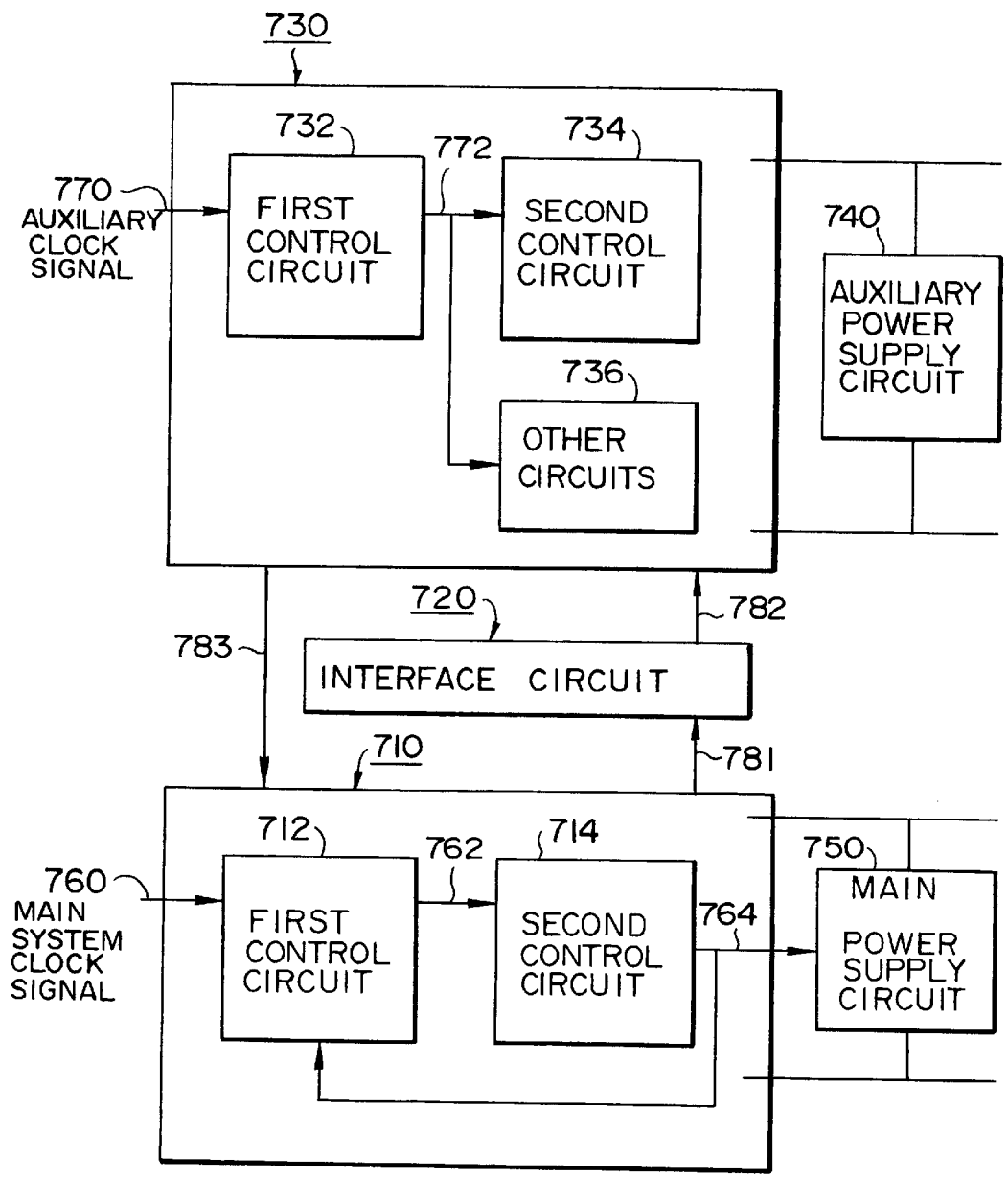
FIG. 12 is a block diagram of an entire semiconductor integrated circuit having a semiconductor circuit, using an auxiliary clock signal of the prior art.

FIG. 10 is a block diagram of the interior of a printer that is one example of such electronic equipment, and FIG. 11 is an external view thereof. This printer uses a bit-map memory 650 as a work area to generate print images based on operating information from an operating panel 620 and font information from a code memory 630 and font memory 640, and uses a print output section 660 to output them. A display panel 670 is used to inform the user of the state and mode of the printer. A microprocessor 500 uses the sum-of-products operation functions described in the sections on the above embodiments to perform the processing required for operations such as drawing straight lines and arcs, and enlarging/reducing images.

Note that the electronic equipment to which the microprocessor of this invention is applied is not limited to the above described example, and various other applications could be considered such as a portable telephone (cellular phone), a pocket handy phone (PHS), a pager, audio equipment, an electronic organizer, an electronic desktop calculator, a point-of-sales (POS) terminal, a device provided with a touch panel, a projector, a word-processor, a personal computer, a television, or a video tape recorder with a view-finder or monitor.

Furthermore, the device and methods in accordance with this invention were described above with reference to specific embodiments, but those skilled in the art can devise variations on the embodiments disclosed within this document within the scope of the present invention. For example, the configuration could be such that the operation of the auxiliary circuit is based on one auxiliary clock signal, or the operation of the auxiliary circuit could be based on a plurality of auxiliary clock signals. In such a case, the configuration could be such that one oscillator and a plurality of frequency dividers are provided, or a plurality of oscillators could be provided.

Similarly, the configuration could be such that the operation of the main circuit is based on one main clock signal, or the operation of the main circuit could be based on a plurality of main clock signals. In addition, although the description above related to a configuration in which there were one auxiliary circuit and one main circuit, a number of other configuration could be conceived in which there is a plurality of auxiliary circuits and one main circuit, one auxiliary circuit and a plurality of main circuits, or a plurality of main circuits and a plurality of auxiliary circuits. Moreover, the configuration could be such that each block operates in accordance with a plurality of signals.

The auxiliary power supply circuit could have a configuration wherein the auxiliary circuit is halted and also a power supply halt permission signal is output to the auxiliary power supply to halt it.

In addition, the above embodiments described applications of the present invention to a RISC type of CPU, but is can also be applied to a wide range of other types of CPU such as CISC CPUs.

What is claimed is:

1. A semiconductor integrated circuit comprising:
   at least one first semiconductor circuit operating on the basis of at least one first clock signal;
   at least one second semiconductor circuit that assists said first semiconductor circuit, operating on the basis of a request from said first semiconductor circuit and at least one second clock signal independent of said first clock signal; and
   a halt device that causes said second clock signal to halt, said halt device comprising:
      a control signal generation device that generates at least one clock control signal for controlling halting and non-halting of said second clock signal;
      an operation control device that controls halting of operation of said second clock signal, based on said clock control signal;
      a setting device that causes a halt period to be set for said second clock signal, based on a request from said first semiconductor circuit; and
      a counter device that counts an operating period of said second clock signal and outputs the counted counter value to said operation control device;
      said operation control device outputting said clock control signal of said control signal generation device, to halt said second clock signal, when said counter value has reached said halt period.

2. The semiconductor integrated circuit as defined in claim 1,
   wherein each of said operation control device, said counter device, and said control signal generation device is provided with a transistor of a first conductivity type and a transistor of a second conductivity type having a conductivity opposite to said first conductivity type; and
   wherein said transistor of the first conductivity type of said counter device is electrically disconnected from said transistors of the first conductivity type of said operation control device and said control signal generation device, and also said transistor of the second conductivity type of said counter device is electrically connected to said transistors of the second conductivity type of said operation control device and said control signal generation device.

3. The semiconductor integrated circuit as defined in claim 1, wherein said setting device comprises:
   a storage device that stores said halt period for said second clock signal; and
   a data write device that writes said halt period to at least said storage device, based on a request from said first semiconductor circuit.

4. The semiconductor integrated circuit as defined in claim 1,
   wherein said second semiconductor circuit includes a power supply circuit that supplies a potential to said second semiconductor circuit and a control circuit that controls said power supply circuit; and
   wherein said control signal generation device outputs a control signal for controlling said control circuit, to said control circuit.

5. The semiconductor integrated circuit as defined in claim 4,
   wherein each of said counter device, said operation control device and said control signal generation device in said second semiconductor circuit operates by using said power supply circuit as a power source.

6. The semiconductor integrated circuit as defined in claim 5,
   wherein said second semiconductor circuit is a time measurement circuit.

7. The semiconductor integrated circuit as defined in claim 1,
   wherein said second semiconductor circuit further comprises an input-output device that inputs and outputs data between a data maintenance device and said operation control device and said control signal generation device.

8. A semiconductor device comprising:
   the semiconductor integrated circuit defined in claim 1;
   a first power supply circuit that shapes a voltage to be supplied to said first semiconductor circuit of said semiconductor integrated circuit; and
   a second power supply circuit that shapes a voltage to be supplied to said second semiconductor circuit of said semiconductor integrated circuit;
   wherein all said circuits are formed on the same substrate.

9. A semiconductor device comprising:
   the semiconductor integrated circuit defined in claim 1;
   a first oscillation circuit that forms said first clock signal;
   a second oscillation circuit that forms said second clock signal;
   a dedicated power supply for a substrate on which said semiconductor integrated circuit and said first and second oscillation circuits are formed, that supplies power to each circuit on said substrate.

10. Electronic equipment comprising the semiconductor device defined in claim 8.

11. Electronic equipment comprising the semiconductor device defined in claim 9.

12. The semiconductor integrated circuit as defined in claim 1, the halt device being part of said second semiconductor circuit.

13. A semiconductor integrated circuit comprising:

at least one first semiconductor circuit operating on the basis of at least one first clock signal;

at least one second semiconductor circuit that assists said first semiconductor circuit, operating on the basis of a request from said first semiconductor circuit and at least one second clock signal independent of said first clock signal;

a half device that causes said second clock signal to halt; and an input-output device that transfers data between said second semiconductor circuit and said first semiconductor circuit.

14. A semiconductor device comprising:

the semiconductor integrated circuit defined in claim 13;

a first power supply circuit that shapes a voltage to be supplied to said first semiconductor circuit of said semiconductor integrated circuit; and a second power supply circuit that shapes a voltage to be supplied to said second semiconductor circuit of said semiconductor integrated circuit;

wherein all said circuits are formed on the same substrate.

15. A semiconductor device comprising:

the semiconductor integrated circuit defined in claim 13;

a first oscillation circuit that forms said first clock signal;

a second oscillation circuit that forms said second clock signal; and a dedicated power supply for a substrate on which said semiconductor integrated circuit and said first and second oscillation circuits are formed, that supplies power to each circuit on said substrate.

16. Electronic equipment comprising the semiconductor device defined in claim 14.

17. Electronic equipment comprising the semiconductor device defined in claim 15.

18. A semiconductor integrated circuit comprising:

at least one first semiconductor circuit operating on the basis of at least one first clock signal;

at least one second semiconductor circuit that assists said first semiconductor circuit, operating on the basis of a request from said first semiconductor circuit and at least one second clock signal independent of said first clock signal; and a halt device that causes said second clock signal to halt, wherein said first semiconductor circuit comprises:

a main power supply circuit that supplies a potential to said first semiconductor circuit; and a main power supply control circuit that controls said main power supply circuit by outputting a power supply halt signal based on said first clock signal, for halting said main power supply circuit.

19. A semiconductor device comprising:

the semiconductor integrated circuit defined in claim 18;

a first power supply circuit that shapes a voltage to be supplied to said first semiconductor circuit of said semiconductor integrated circuit; and a second power supply circuit that shapes a voltage to be supplied to said second semiconductor circuit of said semiconductor integrated circuit;

wherein all said circuits are formed on the same substrate.

20. A semiconductor device comprising:

the semiconductor integrated circuit defined in claim 18;

a first oscillation circuit that forms said first clock signal;

a second oscillation circuit that forms said second clock signal; and a dedicated power supply for a substrate on which said semiconductor integrated circuit and said first and second oscillation circuits are formed, that supplies power to each circuit on said substrate.

21. Electronic equipment comprising the semiconductor device defined in claim 19.

22. Electronic equipment comprising the semiconductor device defined in claim 20.

* * * * *